(12) United States Patent
Hu et al.

(10) Patent No.: US 11,283,723 B2
(45) Date of Patent: Mar. 22, 2022

(54) TECHNOLOGIES FOR MANAGING SINGLE-PRODUCER AND SINGLE CONSUMER RINGS

(71) Applicant: Intel Corporation, Santa Clara, CA (US)

(72) Inventors: Jiayu Hu, Shanghai (CN); Cunming Liang, Shanghai (CN); Ren Wang, Portland, OR (US); Jr-Shian Tsai, Portland, OR (US); Jingjing Wu, Shanghai (CN); Zhaoyan Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 16/144,384

(22) Filed: Sep. 27, 2018

(65) Prior Publication Data

US 2019/0044871 A1    Feb. 7, 2019

(51) Int. Cl.
| | |
|---|---|
| *H04L 12/835* | (2013.01) |
| *H04L 47/30* | (2022.01) |
| *H04L 49/9005* | (2022.01) |
| *H04L 12/42* | (2006.01) |
| *G06F 15/173* | (2006.01) |
| *H04L 49/901* | (2022.01) |

(52) U.S. Cl.
CPC ........ *H04L 47/30* (2013.01); *G06F 15/17337* (2013.01); *G06F 15/17375* (2013.01); *H04L 12/42* (2013.01); *H04L 49/901* (2013.01); *H04L 49/9005* (2013.01)

(58) Field of Classification Search
None
See application file for complete search history.

(56) References Cited

U.S. PATENT DOCUMENTS

| | | | |
|---|---|---|---|
| 2006/0075119 A1* | 4/2006 | Hussain | H04L 69/162 709/227 |
| 2012/0134320 A1* | 5/2012 | Khawer | H04L 49/90 370/328 |
| 2017/0168985 A1* | 6/2017 | Hwang | H04L 67/42 |

* cited by examiner

*Primary Examiner* — Shirpal K Khajuria
(74) *Attorney, Agent, or Firm* — Compass IP Law PC

(57) ABSTRACT

Technologies for managing a single-producer and single-consumer ring include a producer of a compute node that is configured to allocate data buffers, produce work, and indicate that work has been produced. The compute node is configured to insert reference information for each of the allocated data buffers into respective elements of the ring and store the produced work into the data buffers. The compute node includes a consumer configured to request the produced work from the ring. The compute node is further configured to dequeue the reference information from each of the elements of the ring that correspond to the portion of data buffers in which the produced work has been stored, and set each of the elements of the ring for which the reference information has been dequeued to an empty (i.e., NULL) value. Other embodiments are described herein.

25 Claims, 15 Drawing Sheets

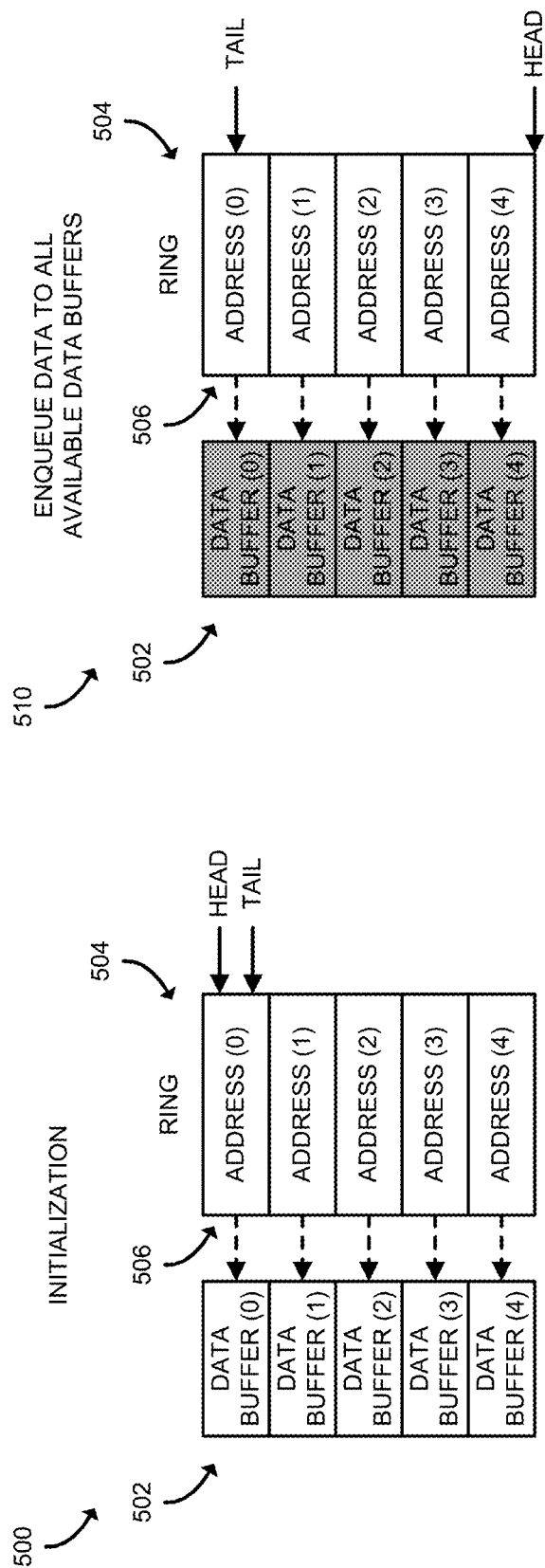

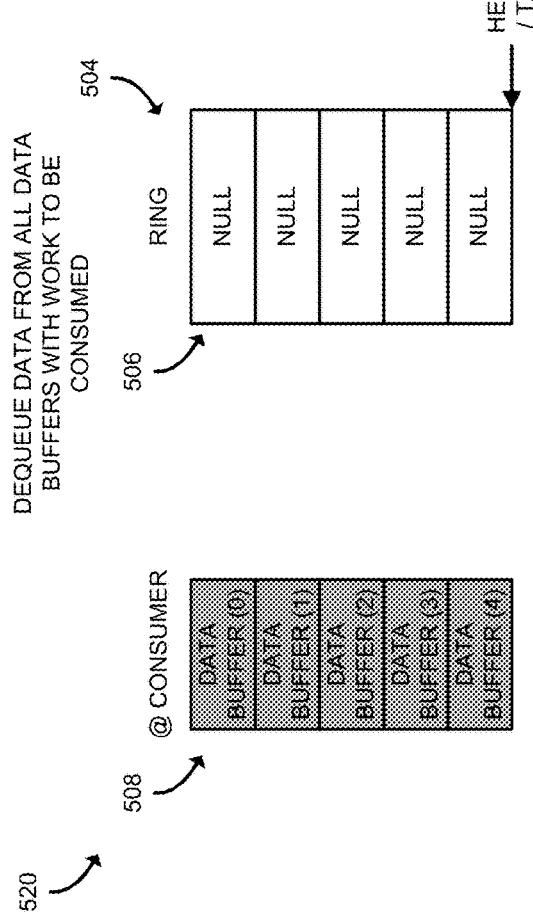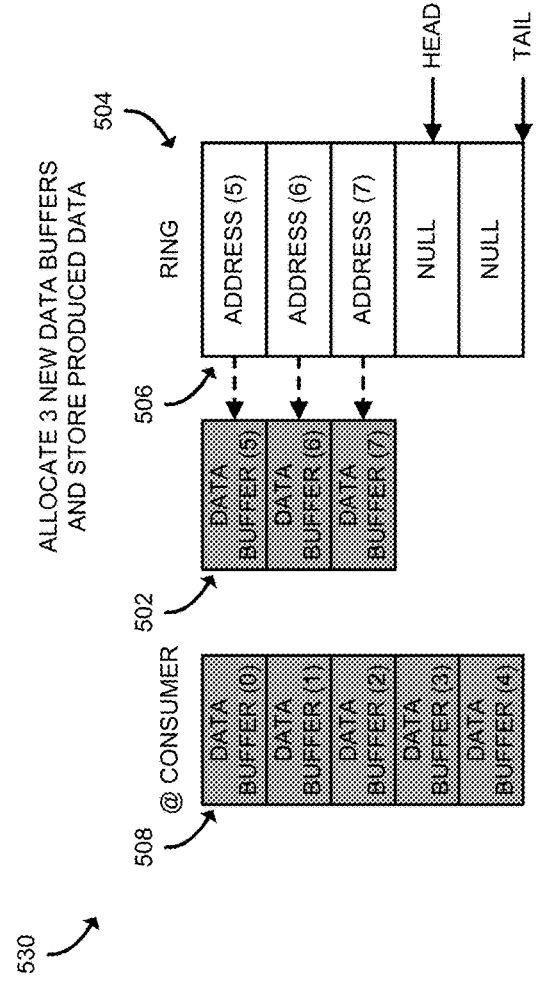

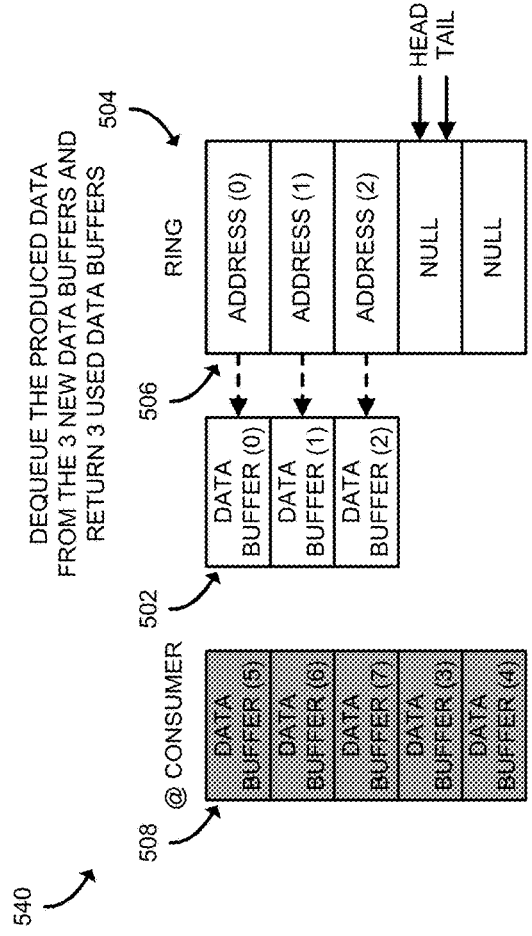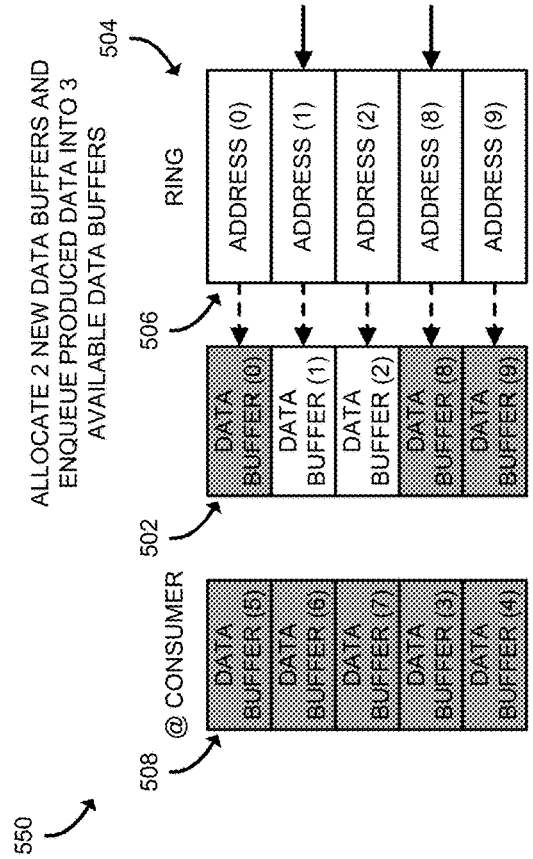

TECHNOLOGIES FOR MANAGING SINGLE-PRODUCER AND SINGLE CONSUMER RINGS

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). Such data networks typically have included complex, large-scale computing environments, such as high-performance computing (HPC) and cloud computing environments. Traditionally, those data networks have included dedicated hardware devices, commonly referred to as network appliances, configured to perform a single function, such as security (e.g., a firewall, authentication, etc.), network address translation (NAT), load-balancing, deep packet inspection (DPI), transmission control protocol (TCP) optimization, caching, Internet Protocol (IP) management, etc.

More recently, network operators and service providers are relying on various network virtualization technologies (e.g., network function virtualization (NFV)) to provide network functions as virtual services which can be executed by a virtualization platform (e.g., using virtual machines (VMs) executing virtualized network functions) on general purpose hardware. Such virtualized services usually contain business logic and functions that can have different processing speeds for processing data. The data to be processed is often stored in a memory buffer and associated information (e.g., a pointer to the memory buffer location) is enqueued into a ring (e.g., a descriptor ring). However, in present zero-copy schemes, delay copy can introduce the head-of-line (HOL) blocking issue and starve certain virtualized services, which can result in resource underutilization. For example, when a slower deep packet inspection (DPI) function co-exists with a fast switching function, the slower DPI function may occupy all of the descriptors and starve the fast switching function.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 5A-5F are a simplified block diagram of at least one embodiment of a workflow for managing single-producer and single-consumer rings using a non-blocking zero-copy scheme that may be executed by the compute node of FIGS. 1 and 2; and FIGS. 6A-5H are a simplified block diagram of at least one embodiment of a workflow for executing a virtual input/output transmit operation using a non-blocking zero-copy scheme that may be executed by the compute node of FIGS. 1 and 2.

DETAILED DESCRIPTION OF THE DRAWINGS

Figure 1:
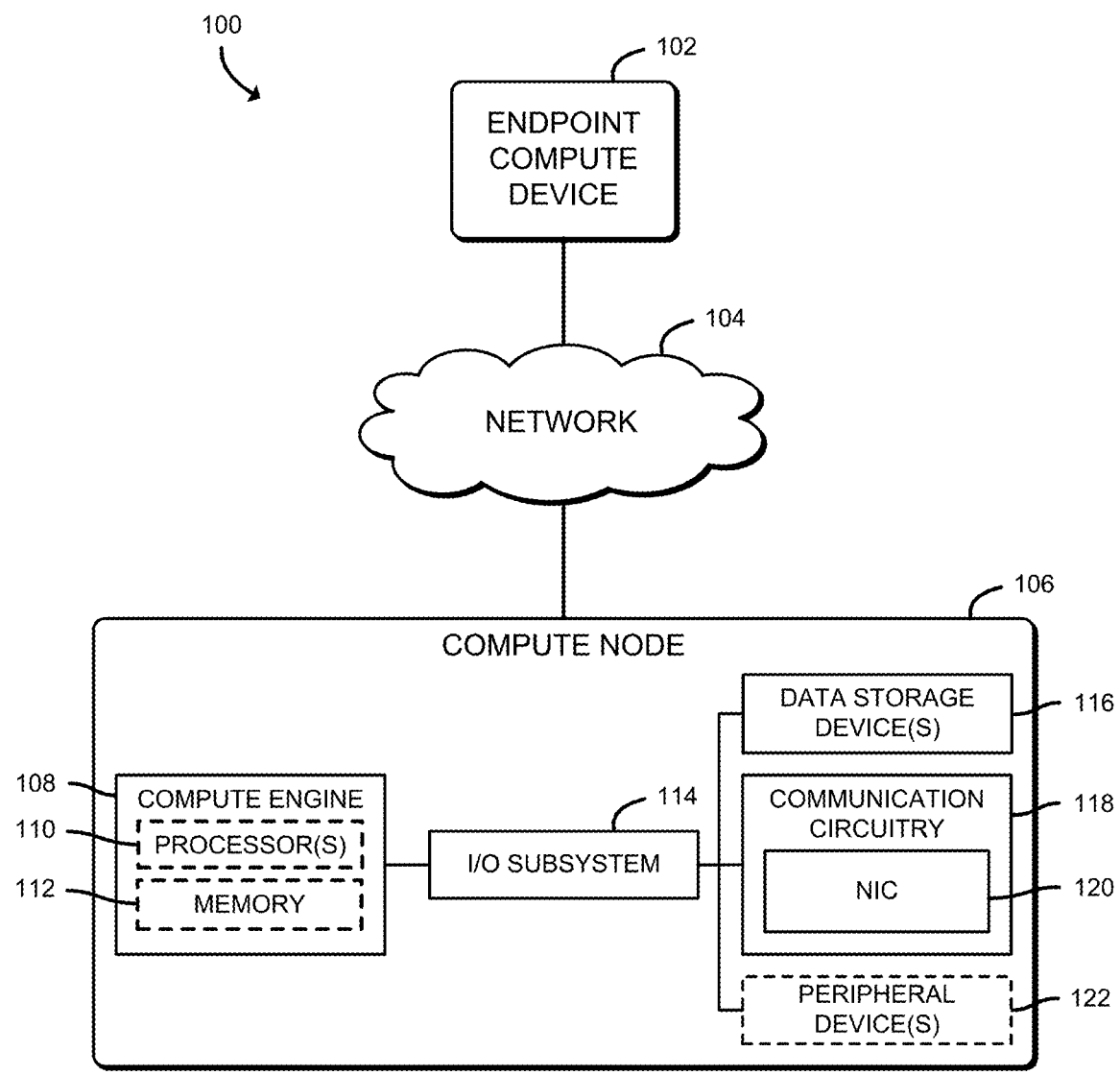
FIG. 1 is a simplified block diagram of at least one embodiment of a system for managing single-producer and single-consumer rings that includes an endpoint compute device communicatively coupled to a compute node.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for dynamically selecting resources for virtual switching includes a source computing device 102 communicatively coupled to a compute node 106 via a network 104. It should be appreciated that while only a single compute node 106 and a single endpoint compute device 102 are shown, the system 100 may include multiple compute nodes 106 and/or multiple endpoint compute devices 102, in other embodiments. It should be further appreciated that the endpoint compute device 102 and the compute node 106 may reside in the same data center or high-performance computing (HPC) environment. Additionally or alternatively, the endpoint compute device 102 and compute node 106 may reside in the same network 104 connected via one or more wired and/or wireless interconnects.

The compute node 106 is configured to generate and transmit (e.g., to the endpoint compute device 102 via the network 104) network packets with data (e.g., Ethernet frames, messages, etc.), as well as receive (e.g., from the endpoint compute device 102 via the network 104) network packets for processing. To perform the processing operations, the compute node 106 may be configured to leverage one or more virtualization technologies to provide one or more virtualized network functions (VNFs) (e.g., executing on one or more virtual machines (VMs), in one or more containers, etc.) to execute network services on commodity hardware of the compute node 106. Such network services may include any type of network service, including firewall services, network address translation (NAT) services, domain name system (DNS) services, load-balancing services, deep packet inspection (DPI) services, transmission control protocol (TCP) optimization services, cache management services, Internet Protocol (IP) address management services, etc.

In network function virtualization (NFV) architecture, a VNF is configured to handle specific network functions that run in one or more VMs on top of hardware networking infrastructure traditionally carried out by proprietary, dedicated hardware, such as routers, switches, servers, cloud computing systems, etc. In other words, each VNF may be embodied as one or more VMs configured to execute corresponding software or instructions to perform a virtualized task. It should be understood that a VM is a software program or operating system that not only exhibits the behavior of a separate computer, but is also capable of performing tasks such as running applications and programs like a separate computer. A VM, commonly referred to as a "guest," is typically configured to run a dedicated operating system on shared physical hardware resources of the device on which the VM has been deployed, commonly referred to as a "host." It should be appreciated that multiple VMs can exist within a single host at a given time and that multiple VNFs may be executing on the compute node 106 at a time.

Upon receipt of a network packet, or the generation thereof, data associated with the network packet is stored in a data buffer, and a pointer to the address of the data buffer is typically stored in an associated descriptor and enqueued in a ring (e.g., a descriptor ring). In use, as will be described in further detail below, the compute node 106 decouples the usage of descriptors and data buffers for a single-producer and single-consumer ring. To do so, for each dequeue operation, a consumer of the data (e.g., a device for performing the processing operation(s)) immediately returns descriptors after dequeue operation, but does not return the data buffers pointed by the descriptors to the ring. In other words, the processing (e.g., business logic/functions) of the data by the consumer is directly performed on the data of the data buffers without having to copy the data buffers.

Additionally, for each enqueue operation, a producer (e.g., a VNF, a VM, etc.) allocates new data buffers for the descriptors whose buffers are not returned yet, and uses the new buffers to store data. Accordingly, when the buffers are returned by the consumer eventually, the producer can now reuse the data buffers. It should be appreciated that, by doing so, head-of-line blocking can be avoided and overall system performance can be improved. In particular, in para-virtualization embodiments, such as those embodiments in which standardized input/output (I/O) virtualization interfaces (e.g., VirtIO) are employed, the software virtualization interface backend can avoid memory copy while solving the head-of-line blocking issue, and enable the front-end (e.g., a producer) and back-end (e.g., a consumer) to dynamically adjust in-flight buffers.

The compute node 106 may be embodied as any type of computation or computing device capable of performing the functions described herein, including, without limitation, a server (e.g., stand-alone, rack-mounted, blade, etc.), a switch (e.g., a disaggregated switch, a rack-mounted switch, a standalone switch, a fully managed switch, a partially managed switch, a full-duplex switch, and/or a half-duplex communication mode enabled switch), a sled (e.g., a compute sled, a storage sled, an accelerator sled, a memory sled, etc.) a router, a network appliance, a web appliance, a processor-based system, and/or a multiprocessor system. Depending on the embodiment, the compute node 106 may be embodied as a distributed computing system. In such embodiments, the compute node 106 may be embodied as more than one computing device in which each computing device is configured to pool resources and perform at least a portion of the functions described herein.

As shown in FIG. 1, the illustrative compute node 106 includes a compute engine 108, an I/O subsystem 114, one or more data storage devices 116, communication circuitry 118, and, in some embodiments, one or more peripheral devices 122. It should be appreciated that the compute node 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may otherwise be embodied as, one or more processors 110 (i.e., one or more central processing units (CPUs)) and memory 112.

The processor(s) 110 may be embodied as any type of processor(s) capable of performing the functions described herein. For example, the processor(s) 110 may be embodied as one or more single-core processors, multi-core processors, digital signal processors (DSPs), microcontrollers, or other processor(s) or processing/controlling circuit(s). In some embodiments, the processor(s) 110 may be embodied as, include, or otherwise be coupled to an FPGA (e.g., reconfigurable circuitry), an ASIC, reconfigurable hardware or hardware circuitry, or other specialized hardware to facilitate performance of the functions described herein.

The memory 112 may be embodied as any type of volatile or non-volatile memory or data storage capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the compute node 106 via the I/O subsystem 114, which may be embodied as circuitry and/or components to facilitate input/output operations with the processor 110, the memory 112, and other components of the compute node 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a SoC and be incorporated, along with one or more of the processor 110, the memory 112, and other components of the compute node 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the compute node 106 and other computing devices, such as the endpoint compute device 102, as well as any network communication enabling devices, such as an access point, network switch/router, etc., to allow communication over the network 104. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 118 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the compute node 106, etc.), performing computational functions, etc.

In some embodiments, performance of one or more of the functions of communication circuitry 118 as described herein may be performed by specialized circuitry, hardware, or combination thereof of the communication circuitry 118, which may be embodied as a SoC or otherwise form a portion of a SoC of the compute node 106 (e.g., incorporated on a single integrated circuit chip along with a processor 110, the memory 112, and/or other components of the compute node 106). Alternatively, in some embodiments, the specialized circuitry, hardware, or combination thereof may be embodied as one or more discrete processing units of the compute node 106, each of which may be capable of performing one or more of the functions described herein.

The illustrative communication circuitry 118 includes the NIC 120, which may also be referred to as a host fabric interface (HFI) in some embodiments (e.g., high performance computing (HPC) environments). The NIC 120 may be embodied as any type of firmware, hardware, software, or any combination thereof that facilitates communications access between the compute node 106 and a network (e.g., the network 104). For example, the NIC 120 may be embodied as one or more add-in-boards, daughtercards, network interface cards, controller chips, chipsets, or other devices that may be used by the compute node 106 to connect with another compute device (e.g., the endpoint compute device 102). While not illustratively shown, it should be appreciated that the NIC 120 typically includes one or more physical ports (e.g., for facilitating the ingress and egress of network traffic) and one or more devices for performing/offloading certain network functionality and/or processing functions (e.g., a DMA engine).

In some embodiments, the NIC 120 may be embodied as part of a SoC that includes one or more processors, or included on a multichip package that also contains one or more processors. Additionally or alternatively, in some embodiments, the NIC 120 may include one or more processing cores (not shown) local to the NIC 120. In such embodiments, the processing core(s) may be capable of performing one or more of the functions described herein. In some embodiments, the NIC 120 may additionally include a local memory (not shown). In such embodiments, the local memory of the NIC 120 may be integrated into one or more components of the compute node 106 at the board level, socket level, chip level, and/or other levels.

The one or more peripheral devices 122 may include any type of device that is usable to input information into the compute node 106 and/or receive information from the compute node 106. The peripheral devices 122 may be embodied as any auxiliary device usable to input information into the compute node 106, such as a keyboard, a mouse, a microphone, a barcode reader, an image scanner, etc., or output information from the compute node 106, such as a display, a speaker, graphics circuitry, a printer, a projector, etc. It should be appreciated that, in some embodiments, one or more of the peripheral devices 122 may function as both an input device and an output device (e.g., a touchscreen display, a digitizer on top of a display screen, etc.). It should be further appreciated that the types of peripheral devices 122 connected to the compute node 106 may depend on, for example, the type and/or intended use of the compute node 106. Additionally or alternatively, in some embodiments, the peripheral devices 122 may include one or more ports, such as a USB port, for example, for connecting external peripheral devices to the compute node 106.

The endpoint compute device 102 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a sled (e.g., a compute sled, an accelerator sled, a storage sled, a memory sled, etc.), a network appliance (e.g., physical or virtual), a web appliance, a distributed computing system, a processor-based system, and/or a multiprocessor system. While not illustratively shown, it should be appreciated that endpoint compute device 102 includes similar and/or like components to those of the illustrative compute node 106. As such, figures and descriptions of the like/similar components are not repeated herein for clarity of the description with the understanding that the description of the corresponding components provided above in regard to the compute node 106 applies equally to the corresponding components of the endpoint compute device 102. Of course, it should be appreciated that the computing devices may include additional and/or alternative components, depending on the embodiment.

The network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communications (e.g., between the compute node 106 and the endpoint compute device 102), which are not shown to preserve clarity of the description.

Figure 2:
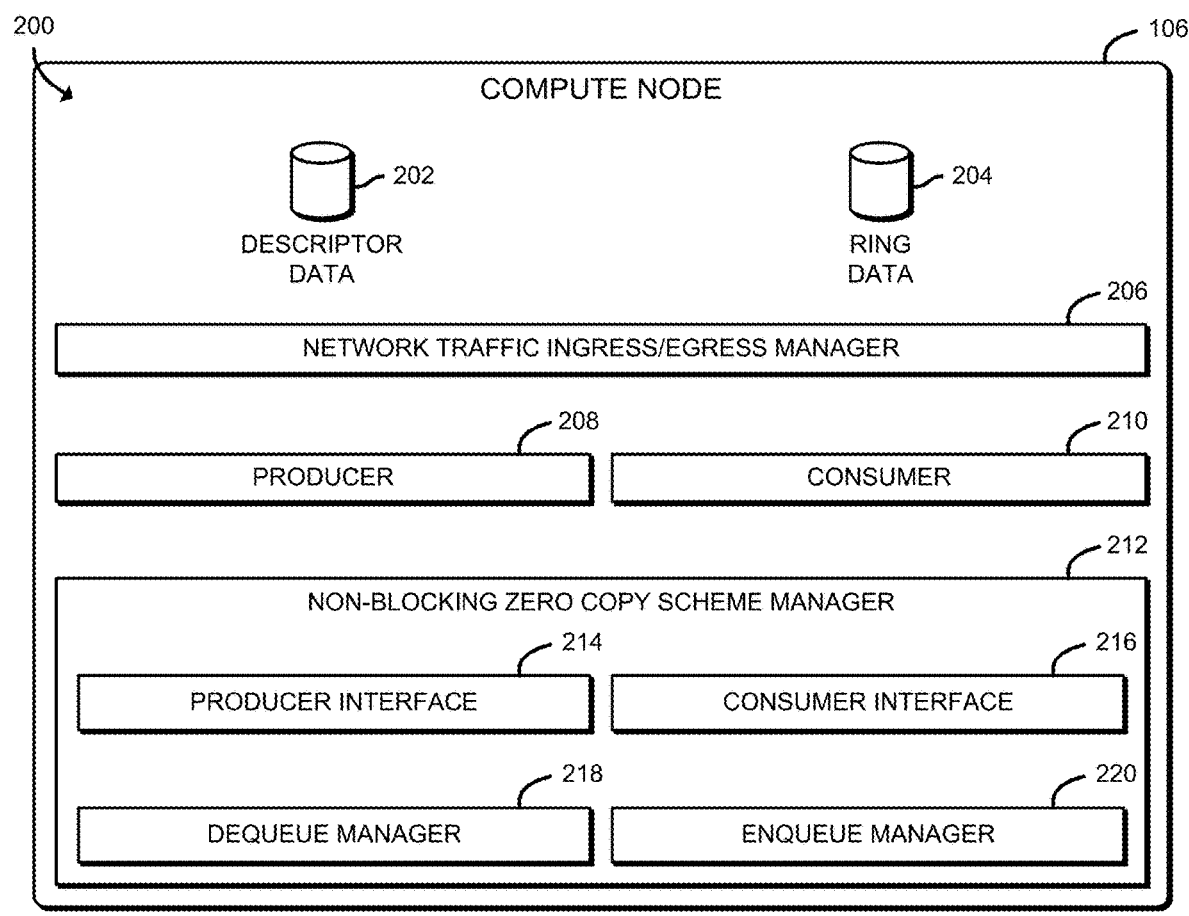
FIG. 2 is a simplified block diagram of at least one embodiment of an environment of the compute node of the system of FIG. 1.

Referring now to FIG. 2, in use, the compute node 106 establishes an environment 200 during operation. The illustrative environment 200 includes a network traffic ingress/egress manager 206, a producer 208, a consumer 210, and a non-blocking zero copy scheme manager 212. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 206, producer circuitry 208, consumer circuitry 210, non-blocking zero copy scheme management circuitry 212, etc.). It should be appreciated that one or more functions described herein as being performed by the network traffic ingress/egress management circuitry 206, the producer circuitry 208, the consumer circuitry 210, and/or the non-blocking zero copy scheme management circuitry 212 may be performed, at least in part, by one or more other components of the compute node 106, such as the compute engine 108, the I/O subsystem 114, the communication circuitry 118 (e.g., the NIC 120), an ASIC, a programmable circuit such as an FPGA, and/or other components of the compute node 106. It should be further appreciated that associated instructions may be stored in the memory 112, the data storage device(s) 116, and/or other data storage location, which may be executed by one of the processors 110 and/or other computational processor of the compute node 106.

Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the NIC 120, the compute engine 108, and/or other software/hardware components of the compute node 106. It should be appreciated that the compute node 106 may include other components, sub-components, modules, sub-modules, logic, sub-logic, and/or devices commonly found in a computing device (e.g., device drivers, interfaces, etc.), which are not illustrated in FIG. 2 for clarity of the description.

In the illustrative environment 200, the compute node 106 additionally includes descriptor data 202 and ring data 204, each of which may be accessed by the various components and/or sub-components of the compute node 106. Further, each of the descriptor data 202 and the ring data 204 may be accessed by the various components of the compute node 106. Additionally, it should be appreciated that in some embodiments the data stored in, or otherwise represented by, each of the descriptor data 202 and the ring data 204 may not be mutually exclusive relative to each other. For example, in some implementations, data stored in the descriptor data 202 may also be stored as a portion of the ring data 204, or vice versa, or in another alternative arrangement. As such, although the various data utilized by the compute node 106 is described herein as particular discrete data, such data may be combined, aggregated, and/or otherwise form portions of a single or multiple data sets, including duplicative copies, in other embodiments.

The network traffic ingress/egress manager 206, which may be embodied as hardware, firmware, software, virtualized hardware, emulated architecture, and/or a combination thereof as discussed above, is configured to receive inbound and route/transmit outbound network traffic. To do so, the network traffic ingress/egress manager 206 is configured to facilitate inbound/outbound network communications (e.g., network traffic, network packets, network flows, etc.) to and from the compute node 106. For example, the network traffic ingress/egress manager 206 is configured to manage (e.g., create, modify, delete, etc.) connections to physical and virtual network ports (e.g., virtual network interfaces) of the compute node 106 (e.g., via the communication circuitry 118, or more particularly the NIC 120), as well as the ingress/egress buffers/queues associated therewith.

The producer 208, which may be embodied as hardware, firmware, software, virtualized hardware, emulated architecture, and/or a combination thereof as discussed above, is configured to produce data for consumption (e.g., by the consumer 210). It should be appreciated that the producer 208 may be configured to produce various types of data, depending on the intended use or type of the producer 208. For example, the producer 208 may be embodied as a VM that is configured to distribute the produced data via an associated driver. The producer 208 is additionally configured to allocate data buffers (e.g., in the memory 112, in the data storage device 116, etc.) in which produced data is to be stored, as well as store produced data into the allocated data buffers and indicate in a corresponding element in the ring at least an address (e.g., the address in memory, a pointer to the address in memory, etc.) associated with the allocated data buffer in which produced data has been stored.

The consumer 210, which may be embodied as hardware, firmware, software, virtualized hardware, emulated architecture, and/or a combination thereof as discussed above, is configured to consumer data that has been produced (e.g., by the producer 208) for consumption. It should be appreciated that the consumer 210 may be configured to consume a particular type of data, depending on the intended use or type of the consumer 210. For example, the consumer 210 may be embodied as an I/O device capable of performing offloaded data processing operations associated with that type of I/O device. The consumer 210 is also configured to read data buffers (e.g., via the consumer interface 216 of the non-blocking zero copy scheme manager 212) using data buffer reference information retrieved from elements of the ring (i.e., ring elements).

The consumer 210 is additionally configured to set the buffer address of the ring elements for which the data buffer reference information has been retrieved to NULL (i.e., no value). After processing the data associated with the read data buffers, the consumer 120 is configured to return them to the ring. To return those data buffers, the consumer 120 is configured to write the reference information of those data buffers back to the ring elements that have a NULL value. In other words, the consumer 210 first tries to return the completed data buffers which have been retrieved previously and are finished processing. To do so, the consumer 210 sets the data buffer addresses of the ring elements whose addresses are NULL to the addresses of the completed data buffers. However, if there are no completed data buffers, the consumer 210 will wait until there are ring elements with a NULL value. After the applicable data buffers have been set to NULL and any completed data buffers returned, the consumer 210 can then process the data in the retrieved data buffers. It should be appreciated that the incoming data buffers are only accessible to the consumer 210, such that only the consumer 210 can directly work on the data buffers (e.g., at a future point in time) without performing a memory copy operation The non-blocking zero copy scheme manager 212, which may be embodied as hardware, firmware, software, virtualized hardware, emulated architecture, and/or a combination thereof as discussed above, is configured to manage single-producer and single-consumer rings using a non-blocking zero-copy scheme. To do so, the non-blocking zero copy scheme manager 212 is configured to manage a number of ring elements of a single-producer and single-consumer ring. The ring elements are configured to store data buffer information, such as an address in memory of the data buffer, or a pointer to the address, and a length of the data buffer. To do so, the non-blocking zero copy scheme manager 212 includes a producer interface 214, a consumer interface 216, a dequeuer manager 218, and an enqueue manager 220.

The producer interface 214 is configured to function as an interface between the producer 208 and the non-blocking zero copy scheme manager 212 (e.g., the enqueue manager 216). For example, the producer interface 214 is configured to receive requests to enqueue data buffer references (e.g., a pointer to an address of the data buffer, a length of the data buffer, etc.) into elements of a ring and provide an indication to the requesting producer 208 that the data buffer reference(s) have been stored/enqueued in the ring element(s). The consumer interface 216 is configured to function as an interface between the consumer 210 and the non-blocking zero copy scheme manager 212 (e.g., the dequeuer manager 218). For example, the consumer interface 216 is configured to receive requests for the retrieval of produced data from a consumer 210 that is ready to consumer the data (e.g., retrieve data buffer reference information from the ring element(s) and place the retrieved reference information into its own queue for consumption of the data associated therewith).

The dequeue manager 218 is configured to manage dequeue operations requested of the ring by a consumer (e.g., the consumer 210). To do so, the dequeue manager 214 is configured to perform a dequeue operation, in response to a request from the consumer 210, to retrieve the information stored in one or more ring elements and then set the buffer address of the ring element(s) to NULL. Accordingly, the dequeue manager 218 is configured to read data buffer reference information (e.g., a pointer to the address of a data buffer in which produced data has been stored, a length of the data buffer, etc.) from a number of ring elements of the ring, as well as update the data buffer reference information for each ring element. It should be appreciated that the dequeue manager 218 is configured to read data from a tail of the ring. As such, the dequeue manager 218 is further configured to manage a reference to the tail of the ring.

The enqueue manager 216 is configured to manage enqueue operations of the ring by a producer (e.g., the producer 208). To do so, the enqueue manager 216 is configured to perform an enqueue operation, in response to a request from the producer 208, to record data buffer reference information into an available ring element. It should be understood that a ring element is considered to be available (i.e., an available ring element) if that ring element's data buffer reference information is presently set to NULL or does not otherwise include any data buffer reference information. It should be appreciated that the enqueue manager 216 is configured to write data to the head of the ring. As such, the enqueue manager 216 is further configured to manage a reference to the tail of the ring.

Figure 3:
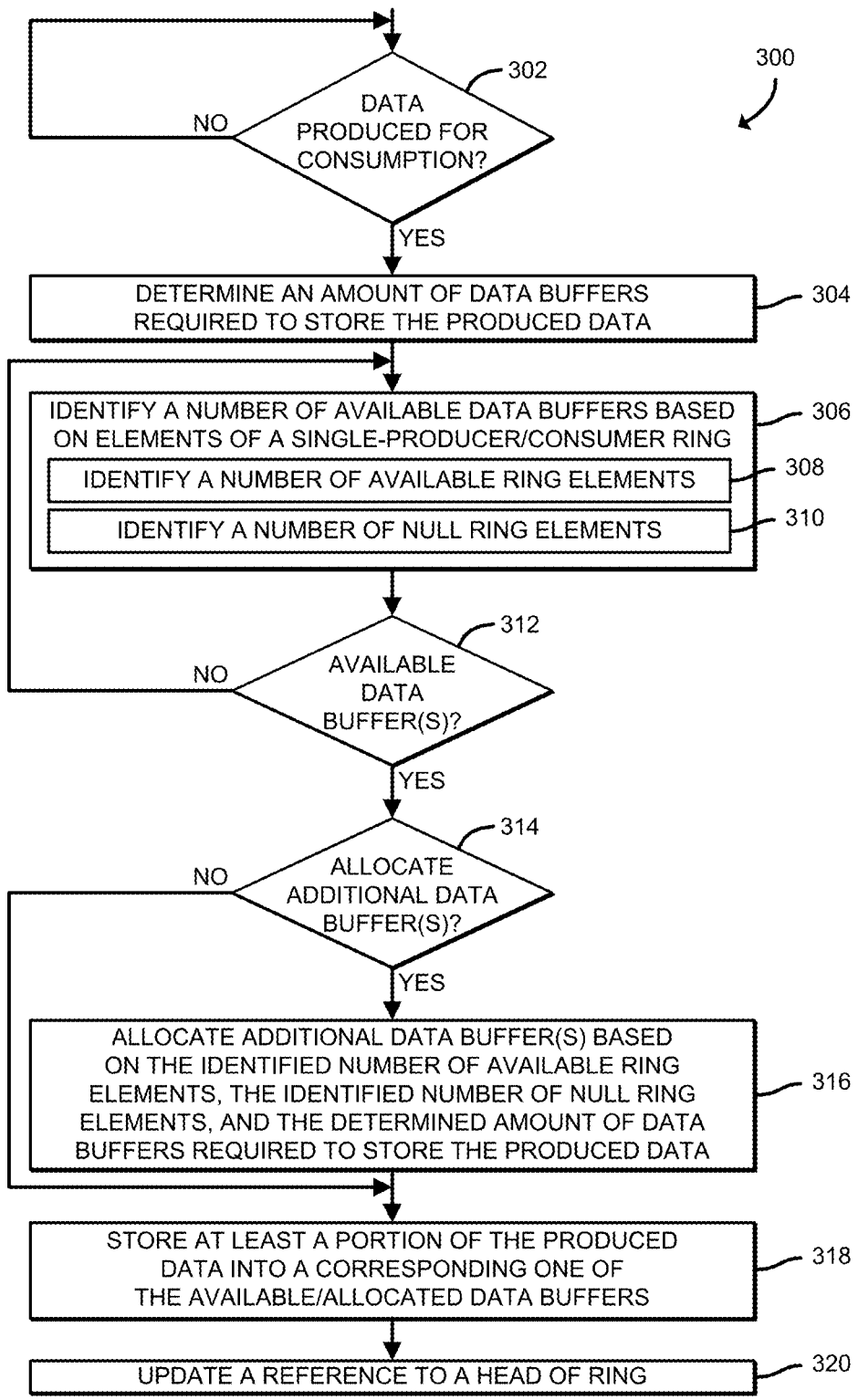
FIG. 3 is a simplified block diagram of at least one embodiment of a method for managing data produced for consumption using a non-blocking zero-copy scheme that may be executed by the compute node of FIGS. 1 and 2.

Referring now to FIG. 3, a method 300 for managing data produced for consumption using a non-blocking zero-copy scheme is shown, which may be executed by a compute node (e.g., the compute node 106 of FIGS. 1 and 2). The method 300 begins in block 302, in which the compute node 106 determines whether data has been produced for consumption. In other words, the compute node 106 determines whether a producer of the compute node 106 (e.g., the producer 208 of FIG. 2) has produced data for which one or more operations are to be performed thereon by a consumer of the compute node 106 (e.g., the consumer 210 of FIG. 2). If so, the method 300 advances to block 304, in which the compute node 106 determines an amount of data buffers required to store the produced data (e.g., based on a size of the produced data and a size of the data buffers).

In block 306, the compute node 106 identifies a number of available data buffers based on elements of a single-producer and single-consumer ring. As described previously, the ring includes a number of elements (i.e., ring elements), in which each of the ring elements is configured to store reference information associated with a data buffer. To identify the number of available data buffers, in block 308, the compute node 106 identifies a number of available ring elements. The available ring elements may include ring elements that have not been used (e.g., associated with data buffers that do not have any data stored therein) or have been used previously and then returned (e.g., associated with data buffers that have been previously used to store data but have since been returned). Additionally, in block 310, the compute node 106 identifies a number of ring elements whose data buffer reference information has been set to NULL (e.g., the data corresponding to the data buffers associated therewith are in the process of being consumed).

In block 312, the compute node 106 determines whether any available data buffers have been identified based on whether any ring elements are available (e.g., do not have data stored in the data buffers associated therewith or the data of the data buffers associated therewith is in the process of being consumed). If not, the method 300 returns to block 306 to again identify whether there are any available data buffers (e.g., data buffers have been returned) as indicated by the data buffer reference information of the ring elements. Otherwise, if one or more available data buffers have been identified, the method 300 advances to block 312, in which the compute node 106 determines whether to allocate any additional data buffers. For example, the determined amount of data buffers required to store the produced data may be satisfied by the number of available ring elements, in which additional data buffers do not need allocated at this time. Furthermore, if the compute node 106 has identified that there are not any ring elements set to NULL, no additional data buffers can be allocated. Under such conditions in which the compute node 106 has determined not to allocate any additional data buffers, the method 300 jumps to block 318, which is described below.

However, if the determined amount of data buffers required to store the produced data is not satisfied by the number of available ring elements and the compute node 106 has identified that at least one of the ring elements has been set to NULL, the compute node 106 can allocate one or more additional data buffers. Under such conditions, the method 300 proceeds to block 316, in which the compute node 106 allocates an additional one or more data buffers based on the identified number of available ring elements, the identified number of NULL ring elements, and the determined amount of data buffers required to store the produced data. In block 318, the compute node 106 stores at least a portion of the produced data into one or more available/allocated data buffers based on the data buffer reference information identified in the available/allocated ring elements. In block 320, the compute node 106 updates a reference to a head pointer of the ring.

Figure 4:
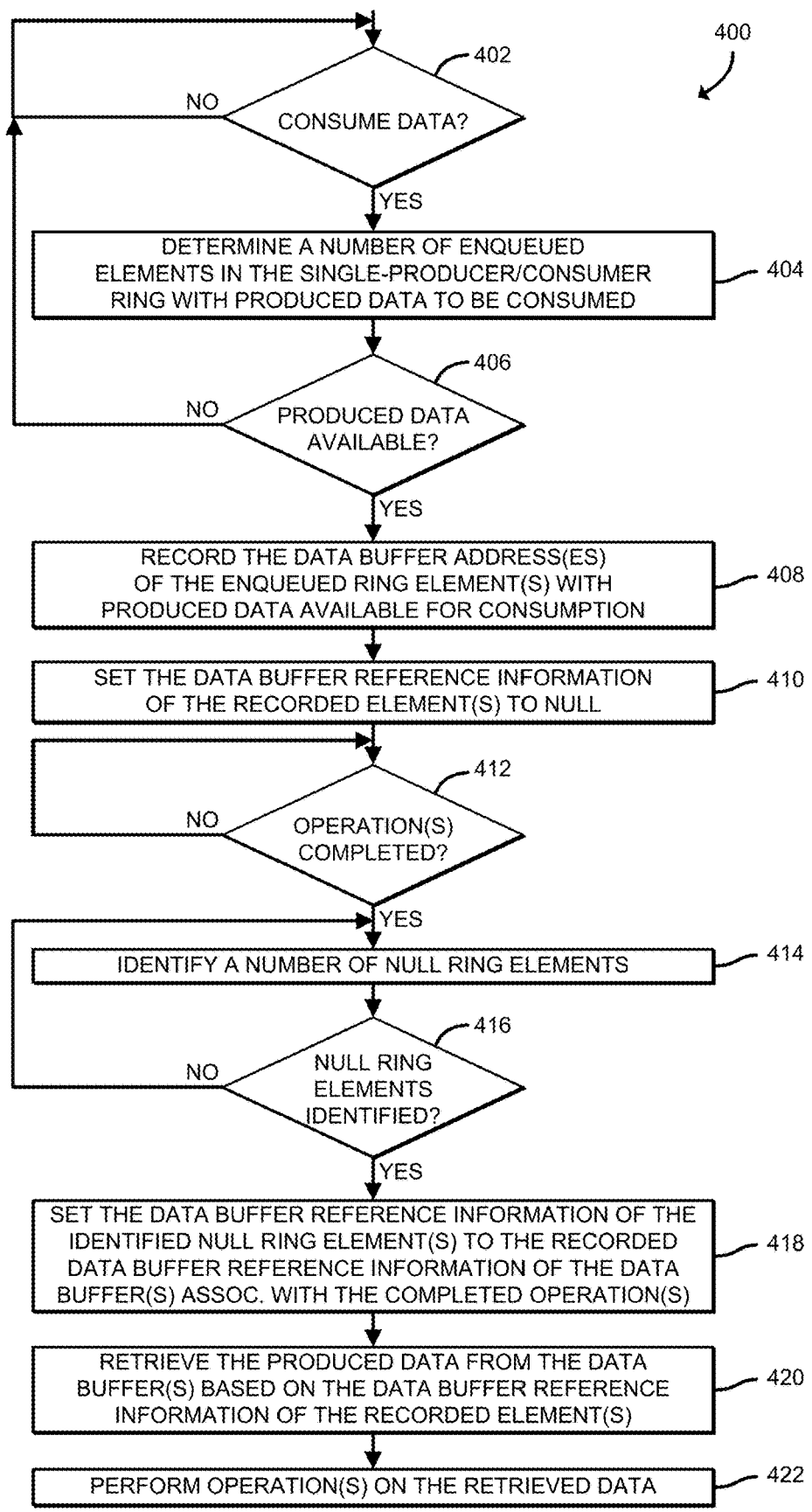
FIG. 4 is a simplified block diagram of at least one embodiment of a method for consuming produced data using a non-blocking zero-copy scheme that may be executed by the compute node of FIGS. 1 and 2.

Referring now to FIG. 4, a method 400 for consuming produced data using a non-blocking zero-copy scheme, which may be executed by a compute node (e.g., the compute node 106 of FIGS. 1 and 2). The method 400 begins in block 402, in which the compute node 106 determines whether to consume data. In other words, a consumer of the compute node 106 (e.g., the consumer 210 of FIG. 2) determines whether to consume data produced by a producer of the compute node 106 (e.g., the producer 208 of FIG. 2). If so, the method 400 advances to block 404, in which the compute node 106 determines a number of enqueued elements in the single-producer and single-consumer ring with produced data available for consumption. In block 406, the compute node 106 determines whether any produced data is available based on data buffer reference information associated with each ring element in the ring. If not, the method 400 returns to block 402; otherwise, the method 400 advances to block 408.

In block 408, the compute node 106 records one or more data buffer addresses of the determined enqueued ring elements with produced data available for consumption. In block 410, the compute node sets the data buffer reference information corresponding to each of the recorded elements to NULL. In block 412, the compute node 106 determines whether the processing operation(s) have completed. If so, the method 400 advances to block 414, in which the compute node 106 identifies a number of ring elements that are presently set to NULL (i.e., NULL ring elements). In block 416, the compute node 106 determines whether any NULL ring elements have been identified.

If the compute node determines that there were not any NULL ring elements identified (i.e., present in the ring), the method 400 returns to block 414 to again identify whether any NULL ring elements are present in the ring; otherwise, the method 400 advances to block 418. In block 418, the compute node 106 sets the data buffer reference information of the identified NULL ring element(s) to the recorded data buffer reference information corresponding to the data buffer(s) for which the operation(s) on the data associated therewith have been completed. In block 420, the compute node 106 retrieves the produced data from the one or more data buffers based on the previously recorded data buffer reference information. In block 422, the compute node 106 performs one or more operations on the retrieved data.

Referring now to FIGS. 5A-5F, a workflow for managing single-producer and single-consumer rings using a non-blocking zero-copy scheme is illustratively shown that may be executed by a compute device (e.g., the compute node 106). As shown in FIG. 5A, a workflow phase 500 illustrates an initialized state of a single-producer and single-consumer ring that includes a set of available data buffers 502 (e.g., that have been previously allocated by a producer of the compute node 106) and a ring 504 (i.e., a single-producer and single-consumer ring) that includes ring elements 506, as well as head and tail pointers. As illustratively shown, the ring 504 includes five ring elements 506, each of which initially includes data buffer reference information. As illustratively shown, the data buffer reference information for each ring element 506 is represented as an address corresponding to a respective one of the available data buffers 502 (e.g., the ring element 506 that includes "address (0)" corresponds to the available data buffer 502 that is designated as "data buffer (0)"). It should be appreciated that, as previously described, the ring elements 506 may include additional or alternative data buffer reference information in other embodiments, such as a pointer to the address in memory of the data buffer, a length of the data buffer, etc.

Referring now to FIG. 5B, a workflow phase 510 illustrates a state of the ring 504 after a producer (e.g., the producer 208 of FIG. 2) of the compute node 106 has enqueued produced data to each of the available data buffers based on the data buffer reference information of each ring element 506, illustratively shown as each of the available data buffers 502 being filled in. Additionally, the tail and header pointers have been updated to reflect the produced data having been stored therein. Referring now to FIG. 5C, a workflow phase 520 illustrates a state of the ring 504 after a consumer (e.g., the consumer 210 of FIG. 2) of the compute node 106 has dequeued the stored data from each of the data buffers represented by the ring elements 506. Further, the workflow phase 520 illustratively shows the data buffers at the consumer 210 (e.g., for processing) and the data buffer reference information of each of the ring elements 506 having been set to NULL. Additionally, the tail and header pointers have again been updated to reflect the produced data having been dequeued.

As illustratively shown in FIG. 5D, a workflow phase 530 illustrates a state of the ring 504 after the producer 208 has tried to send three more data buffers to the ring 504. However, since the data buffers of the ring elements are NULL, the producer 208 has allocated three new data buffers (e.g., at a location in a memory of the compute device 102), updated three ring elements 506 to include corresponding data buffer reference information of the newly allocated data buffers, and stored produced data therein. As illustratively shown, the new available data buffers 502 have different corresponding addresses relative to those now consumed data buffers 508 (e.g., the new available data buffers 502 starting at "data buffer (5)"), which are similarly represented by the corresponding data buffer reference information (e.g., the updated first ring element has changed from "address (0)" initially, to "NULL", to "address (5)" presently). Additionally, the tail and header pointers have again been updated to reflect the data buffers having been enqueued and produced data stored therein.

Referring now to FIG. 5E, a workflow phase 540 illustrates a state of the ring 504 after the consumer 210 has dequeued the produced data associated with the three new data buffers from the ring 504 and returned three used data buffers to the ring 504. As illustratively shown, the three new data buffers of the available data buffers 502 of FIG. 5D are now present in the consumed data buffers 508, and the three returned data buffers are now removed from the consumed data buffers and present in the available data buffers 502. Additionally, the tail and header pointers have again been updated to reflect the data buffers having been returned to the ring 504.

Referring now to FIG. 5F, a workflow phase 550 illustrates a state of the ring 504 after a producer has tried to send three more data buffers. As such, two new data buffers have been allocated (i.e., to replace the remaining two NULL value ring entries 506) and enqueued produced data into three available data buffers 502. As illustratively shown, the produced data has been stored in one of the data buffers of the available data buffers 502 and both of the newly allocated data buffers, which are now present in the available data buffers 502. As also illustratively shown, the data buffer reference information for each of the two new data buffers has been updated in the ring elements 506 (e.g., the first remaining NULL ring element from FIG. 5E has been updated to reflect "address (8)" which corresponds to the first newly allocated data buffer of the available data buffer 502 designated as "data buffer (8)" and the second remaining NULL ring element from FIG. 5E has been updated to reflect "address (9)" which corresponds to the second newly allocated data buffer of the available data buffer 502 designated as "data buffer (9)"). Additionally, the tail and header pointers have again been updated to reflect the data buffers having been updated as a result of the data buffer allocation and storage of the produced data.

It should be appreciated that each consumer does not occupy descriptors but only data buffers. As such, by using the non-blocking zero-copy scheme described herein, a faster consumer should not be blocked by a slower consumer, and the number of in-flight data buffers is not limited by the ring size. Furthermore, even if the processing logic of a consumer is slow, it will not prevent the producer from sending more data to a faster consumer. Accordingly, there should not be a head-of-line blocking issue.

Referring now to FIGS. 6A-6H, a workflow for managing single-producer and single-consumer rings using a non-blocking zero-copy scheme in the execution of a virtual input/output transmit operation is illustratively shown that may be executed by a compute device (e.g., the compute node 106). In other words, unlike the more generalized application of the non-blocking zero-copy scheme described in FIGS. 5A-5E, FIGS. 6A-6H illustrate how the non-blocking zero-copy scheme works in operation for a VirtIO ring.

Figure 6A:
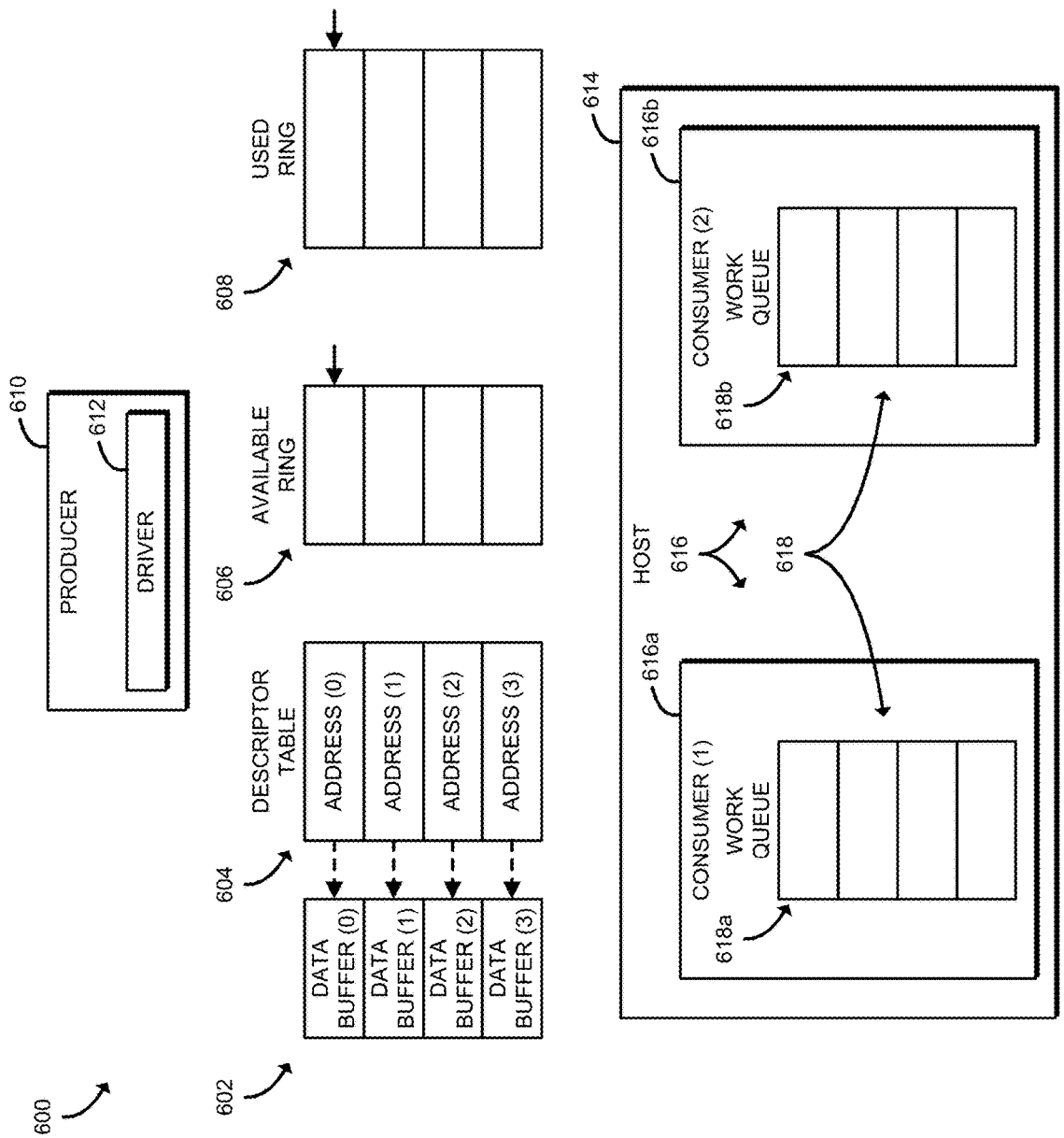

As shown in FIG. 6A, a workflow phase 600 illustrates an initialized state of a set of available data buffers 602 that have been previously allocated by a producer 610 presently executing on the compute node 106, a descriptor table 604 whose entries (i.e., descriptors) have been updated to include data buffer reference information for each of the previously allocated data buffers presently in the available data buffers 602, an available ring 606, and a used ring 608. As illustratively shown, the data buffer reference information for each descriptor is represented as an address corresponding to a respective one of the available data buffers 502 (e.g., the descriptor that includes "address (0)" corresponds to the available data buffer that is designated as "data buffer (0)"). The illustrative producer 610 includes a driver 612 that is configured to provide an interface of the producer 610 (e.g., for issuing tasks initiated by the producer).

The illustrative workflow phase 600 additionally includes a host 614 (e.g., virtual and/or physical device resources of the compute node 106). The illustrative host 614 includes two consumers 616, the first consumer 616 designated as consumer (1) 616a and the second consumer 616 designated as consumer (2) 616b. Each of the consumers 616 includes a respective work queue 618. The illustrative consumer (1) 616a includes the work queue 618a and the illustrative consumer (2) 616b includes the work queue 618b. It should be appreciated that the consumer (1) 616a is slower at processing data relative to the consumer (2) 616b. For example, the consumer (1) 616a may be embodied as a deep packet inspection engine and the consumer (2) 616b may be embodied as an Internet Protocol (IP) router. It should be further appreciated that the producer 610 produces work for both the consumer (1) 616a and the consumer (2) 616b, but each consumer 616 can only consume its respective data type.

Figure 6B:
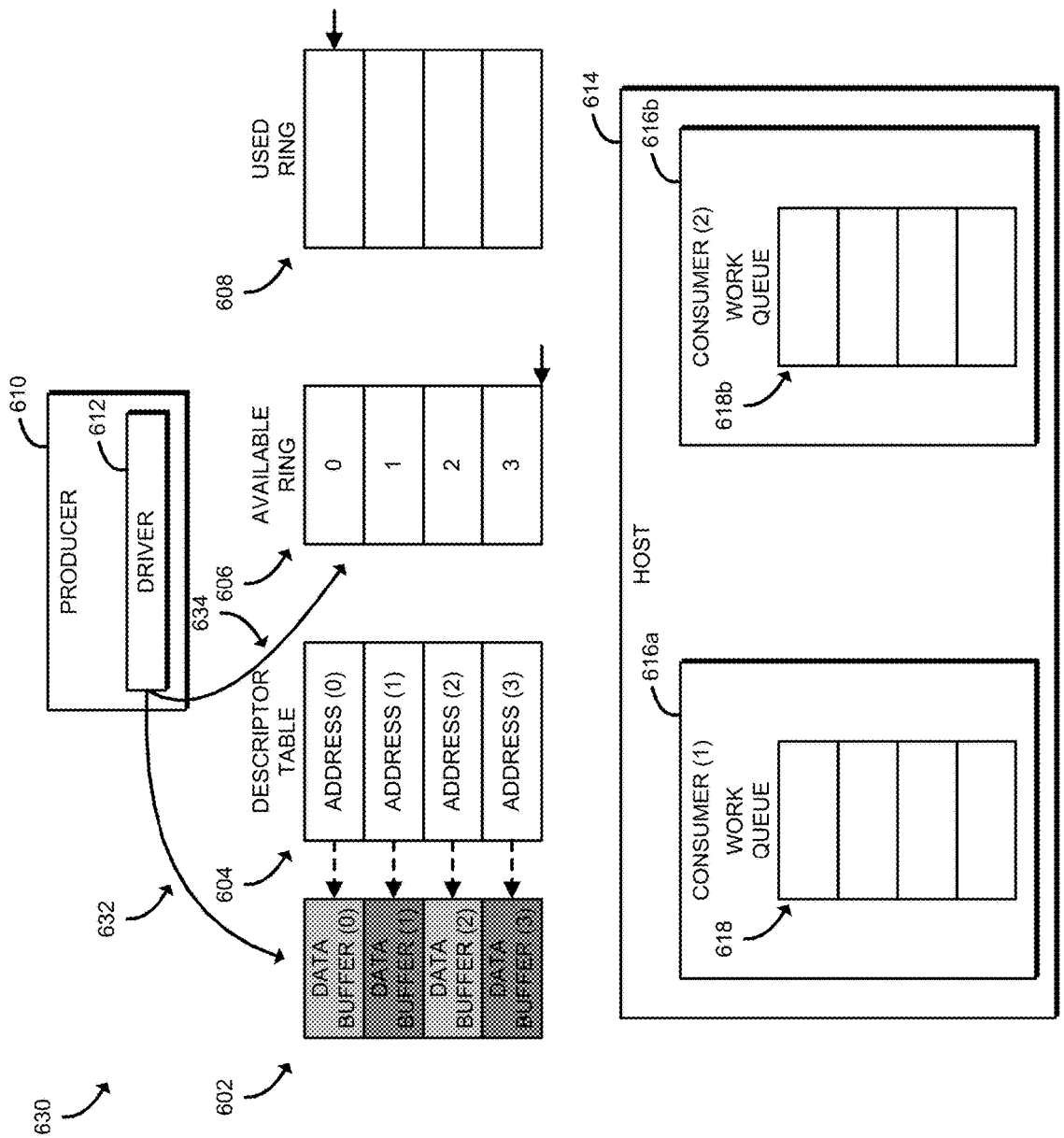
Figure 6C:
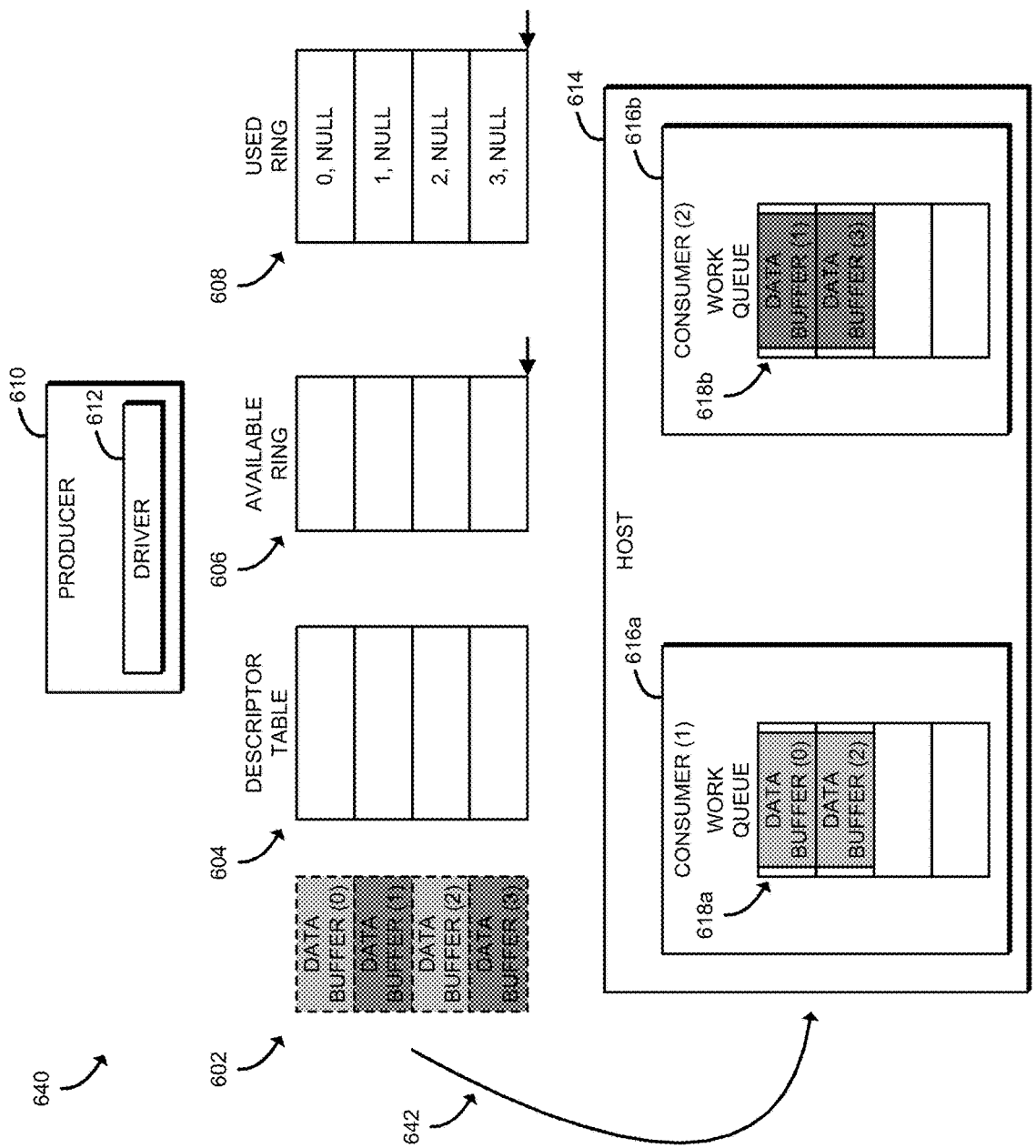

Referring now to FIG. 6B, a workflow phase 630 is shown which illustrates the producer 610, via the driver 612 performing two operations. In the first operation 632, the producer 610 enqueues two requests for the consumer (1) 616a, which are designated with a lighter fill shade, and the producer 610 also enqueues two requests for the consumer (2) 616b, which are designated with a darker fill shade. In the second operation 634, the producer 610 updates the elements of the available ring 606 to reflect the data in the data buffers 602 available for consumption. Referring now to FIG. 6C, a workflow phase 640 is shown in which each of the consumer (1) 616a and the consumer (2) 616b perform a fetch operation 642 to fetch the four requests and return the four descriptors to the used ring 608 immediately. Specifically, the consumer (1) 616a and the consumer (2) 616b write the descriptor index and NULL to each element of the used ring 608. As described previously, the NULL value indicates the data buffer pointed to by the descriptor has been "stolen" and occupied by a consumer 616. As illustratively shown, each work queue 618 of the consumer 616 includes the respective data buffer that has been fetched by that consumer 616.

Figure 6D:
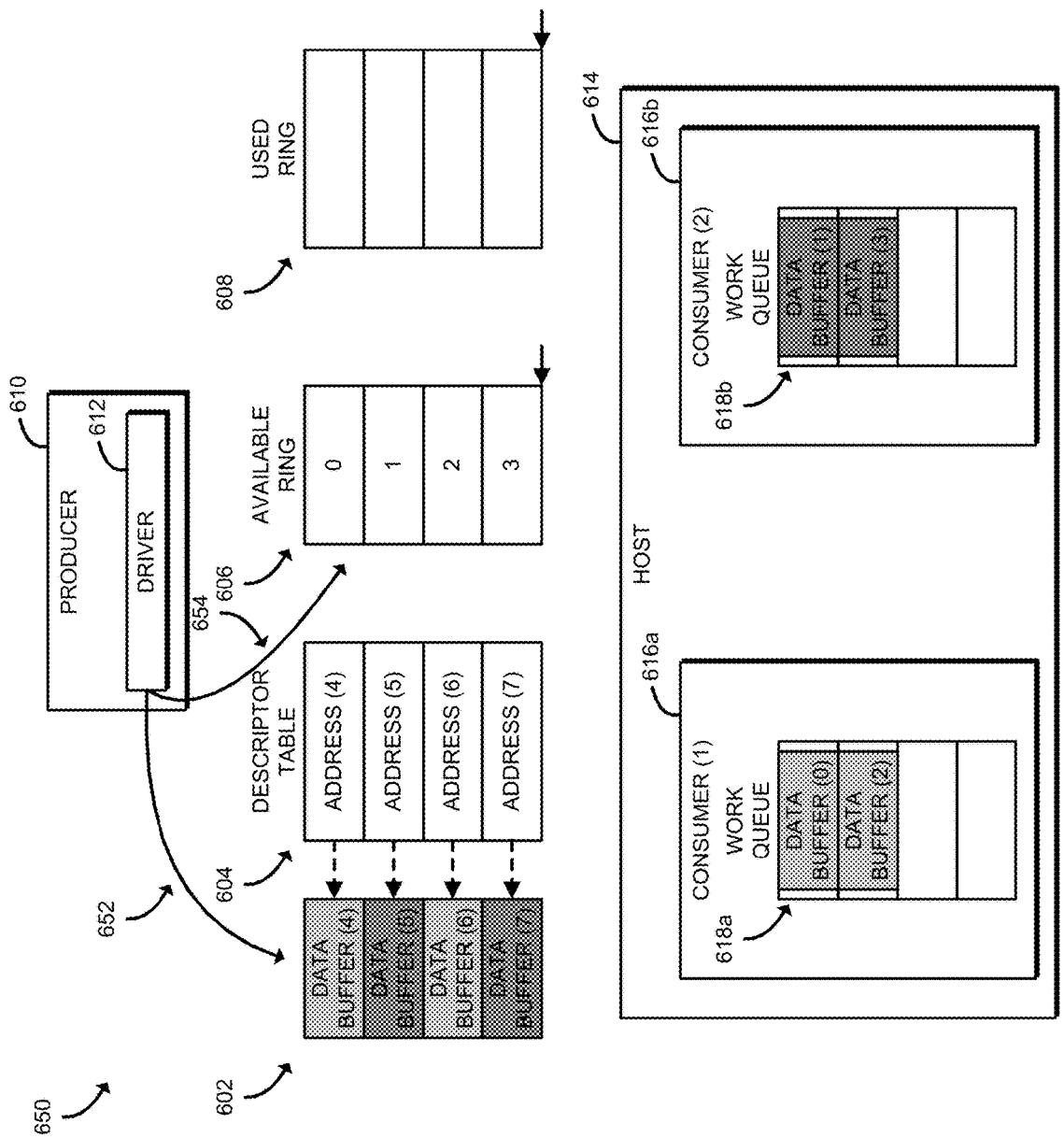

Referring now to FIG. 6D, a workflow phase 650 is shown in which the producer 610 again performs two operations. In the first operation 652, the producer 610 enqueues two new requests for the consumer (1) 616a, which are again designated with a lighter fill shade, and the producer 610 also enqueues two new requests for the consumer (2) 616b, which are again designated with a darker fill shade. As illustratively shown, due to the data buffers previously pointed to by the initial four descriptors having been stolen by the host 614, or more particularly by the consumers 616 of the host 614, the producer 610 additionally allocates four new data buffers in which to enqueue the produced data. In the second operation 654, the producer 610 updates the elements of the available ring 606 to reflect the data in the data buffers 602 available for consumption.

Figure 6E:
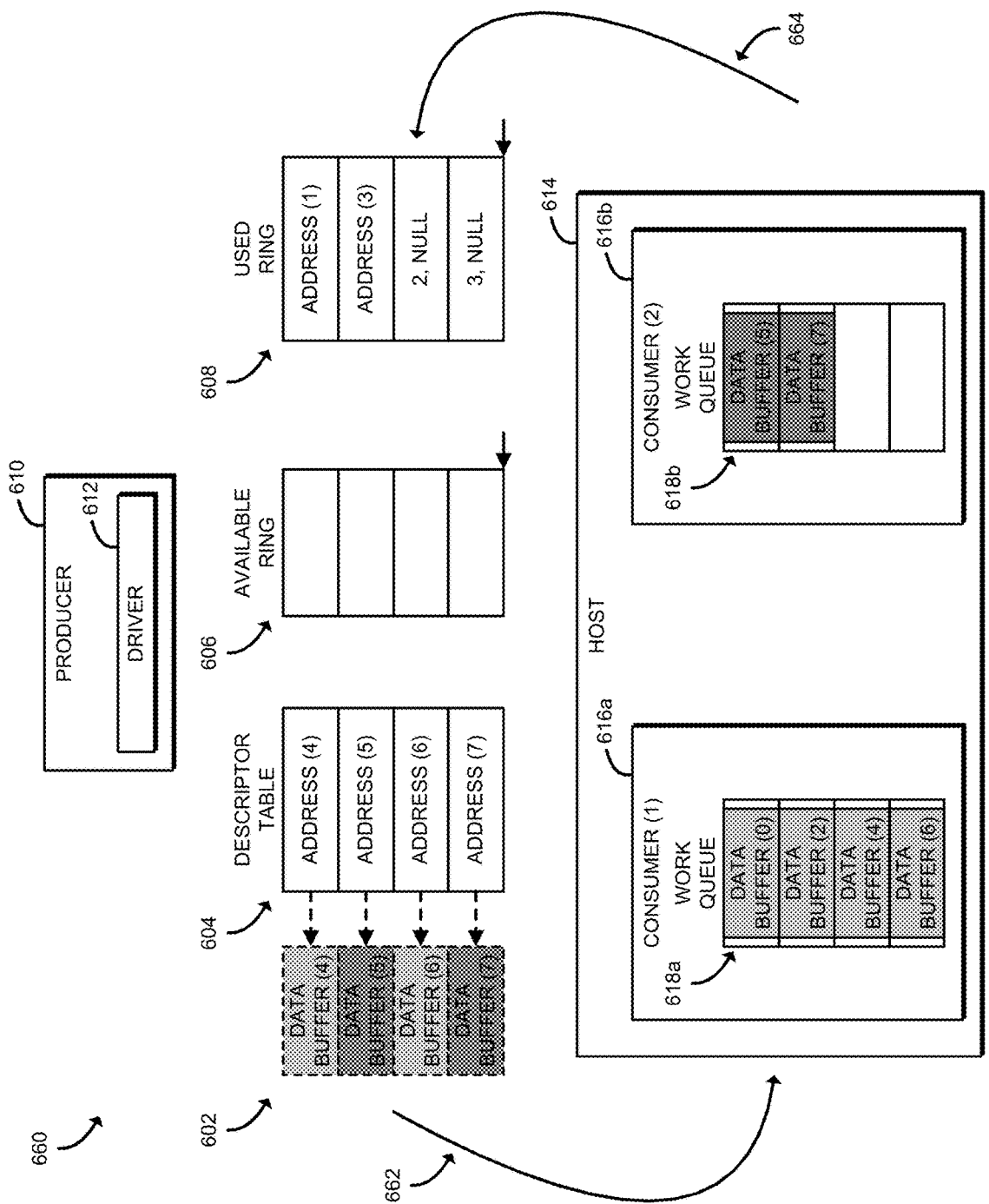

As illustratively shown in FIG. 6E, a workflow phase 660 is shown in which each of the consumers 616 again perform a fetch operation 662 to retrieve the four new data buffers in the available data buffers 602. Further, as also illustratively shown, the consumer (2) 616b has completed processing the two requests that it previously fetched, and the consumer (2) 616b performs a data buffer return operation 664 by writing the two addresses of the data buffers associated with the processed data to the used ring 608.

Figure 6F:
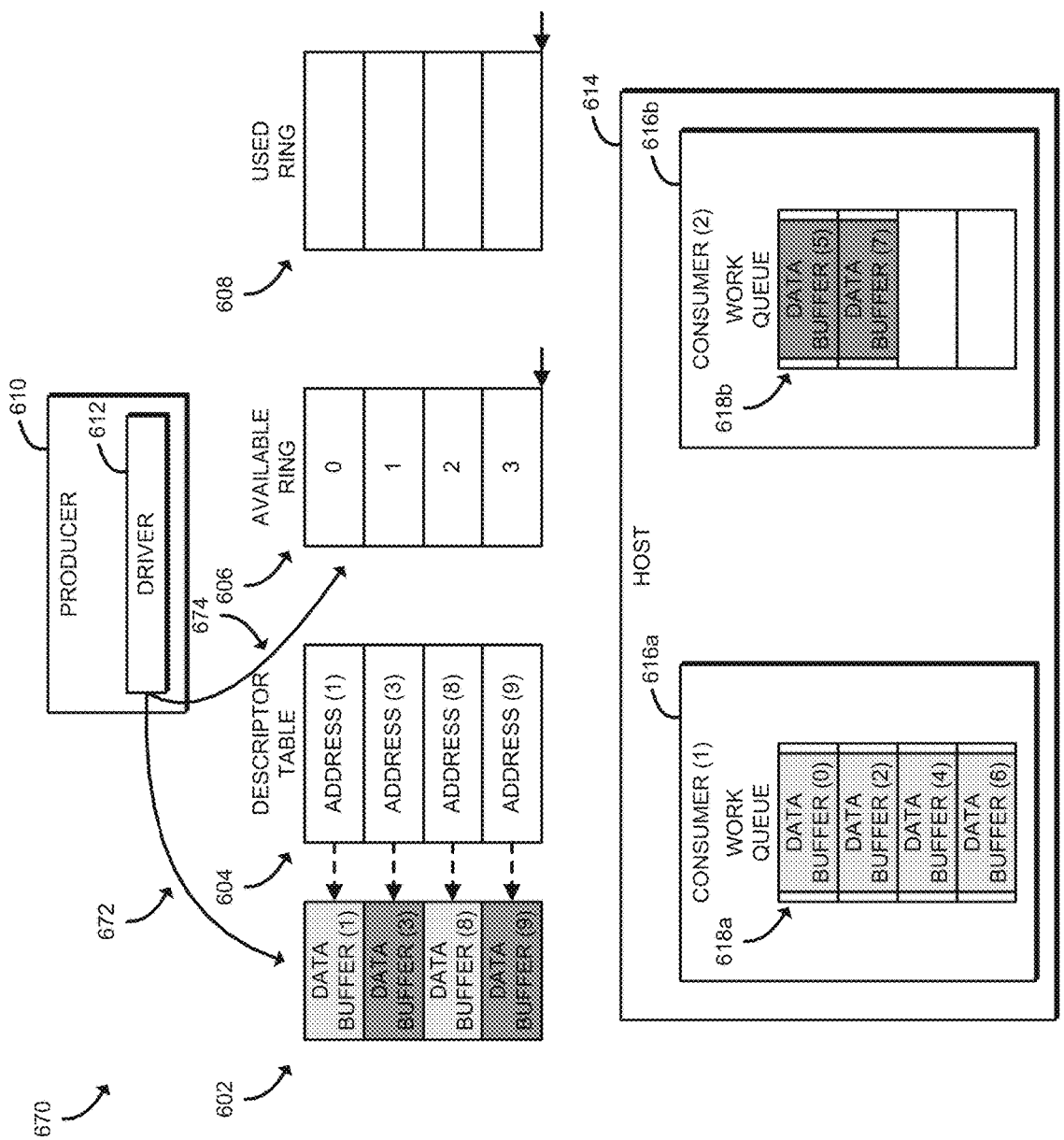

Referring now to FIG. 6F, a workflow phase 670 is shown in which the producer 610 again performs two operations. In the first operation 672, the producer 610 enqueues two new requests for the consumer (1) 616a, which are again designated with a lighter fill shade, and the producer 610 also enqueues two new requests for the consumer (2) 616b, which are again designated with a darker fill shade. As illustratively shown, due to the data buffers previously pointed to by the initial four descriptors having been stolen by the host 614, or more particularly by the consumers 616 of the host 614, the producer 610 additionally allocates two new data buffers in which to enqueue the produced work. It should be appreciated that the producer 610 only needs to allocate two new additional data buffers, as the consumer (2) 616b has returned two data buffers for which the data has been processed. In the second operation 674, the producer 610 updates the elements of the available ring 606 to reflect the data in the data buffers 602 available for consumption.

Figure 6G:
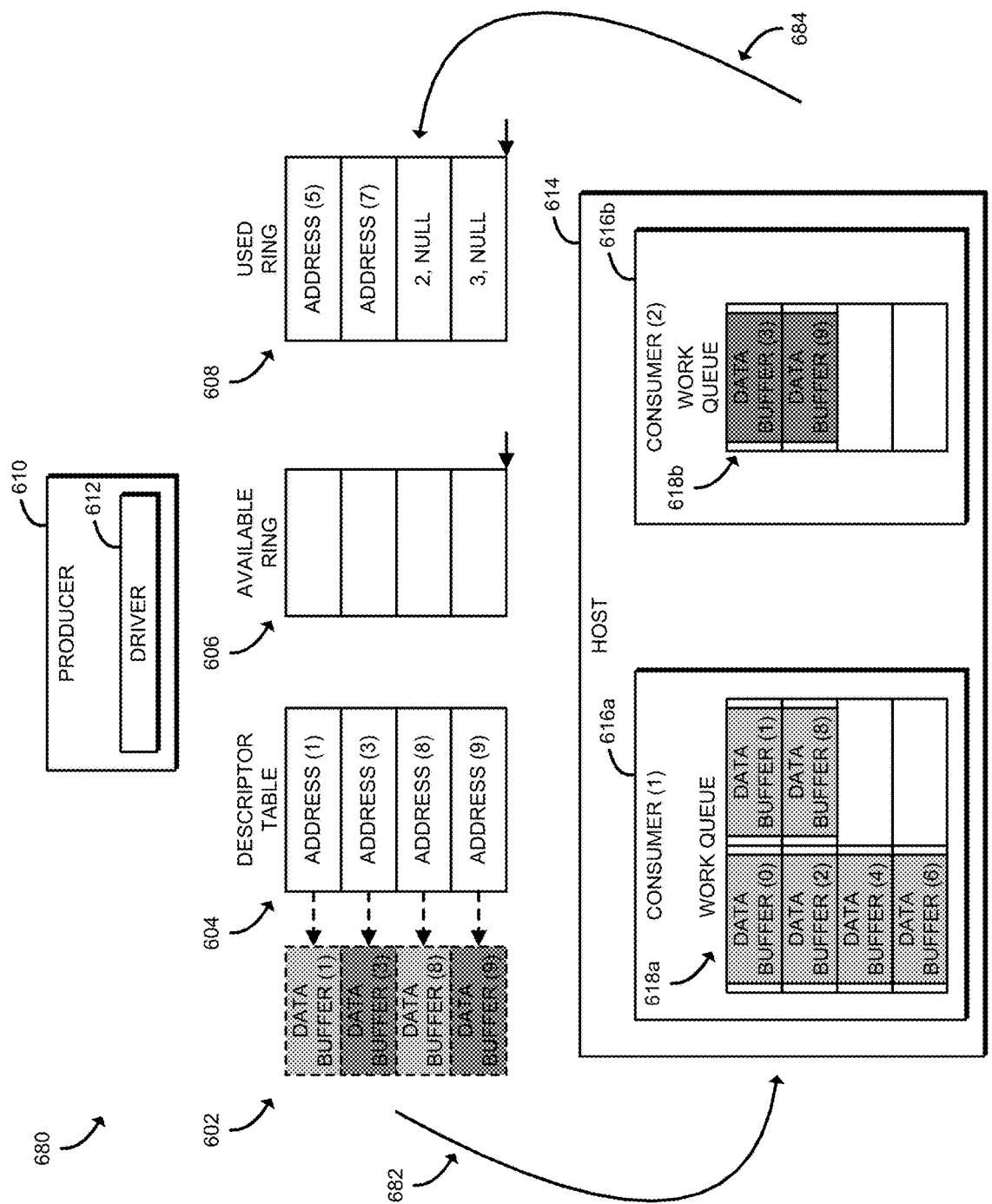
Figure 6H:
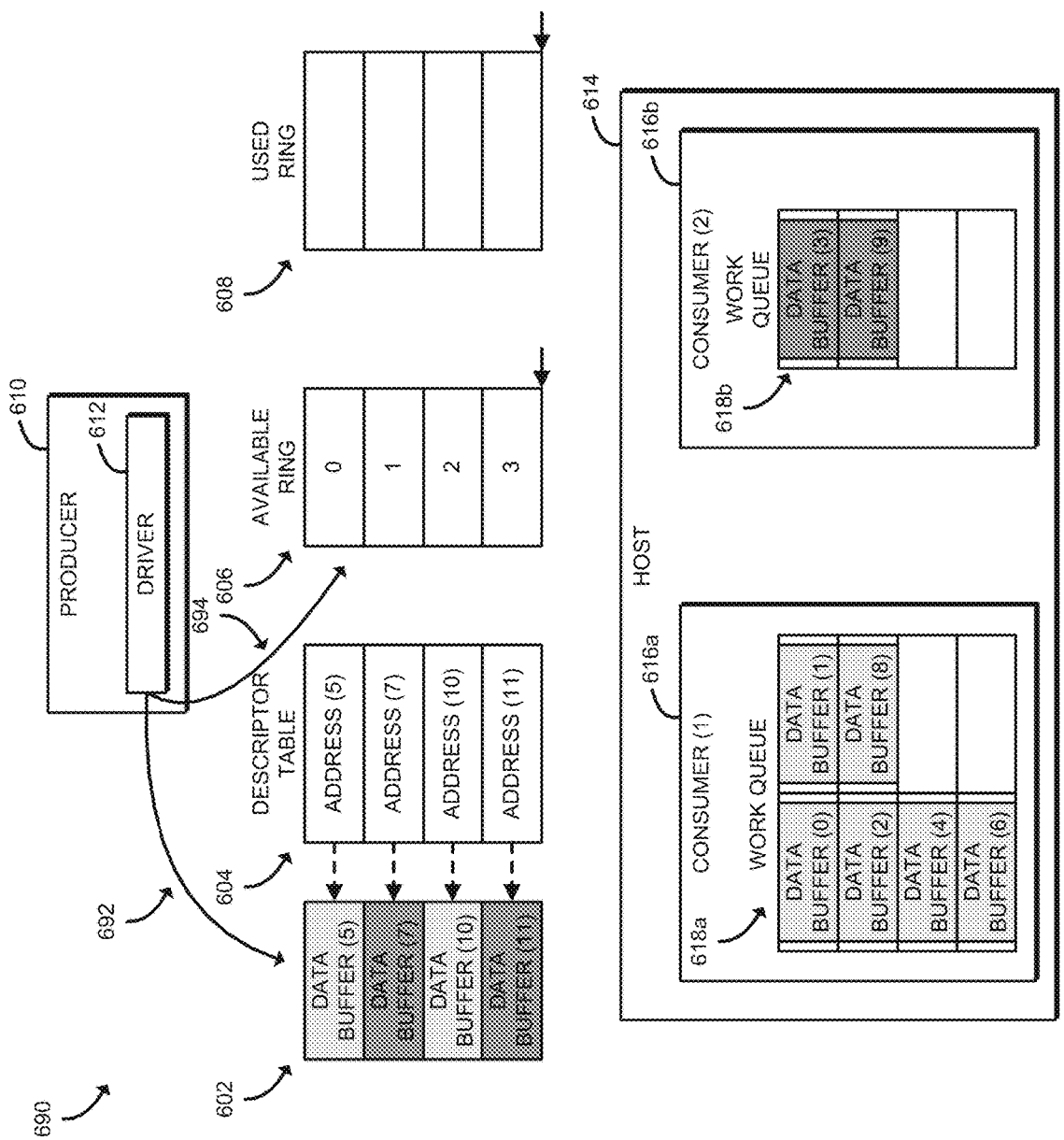

As illustratively shown in FIG. 6G, a workflow phase 680 is shown in which each of the consumers 616 again performs a fetch operation 682 to retrieve the four new data buffers in the available data buffers 602. As described previously, the consumer (1) 616a processes the data slower than the consumer (2) 616b. As such, as illustratively shown, the work queue 618a of the consumer (1) 616a includes all six fetched data buffers, whereas the consumer (2) 616b has completed processing the two requests that it previously fetched. Accordingly, the consumer (2) 616b performs a data buffer return operation 684 by writing the two addresses of the data buffers associated with the processed data to the used ring 608.

Referring now to FIG. 6F, a workflow phase 690 is shown in which the producer 610 again performs two operations. In the first operation 692, the producer 610 enqueues two new requests for the consumer (1) 616a, which are again designated with a lighter fill shade, and the producer 610 also enqueues two new requests for the consumer (2) 616b, which are again designated with a darker fill shade. It should be appreciated that all four of the descriptors in the descriptor table 604 are available for use by the producer. However, it should be further appreciated that, the producer 610 will need to allocate two new data buffers in which to enqueue produced data, as indicated by the entries of the used ring 608. In other words, two entries of the used ring 608 include value data buffers and the two remaining entries of the used ring 608 do not point to data buffers (i.e., contain a NULL value). As described previously, the producer 610 additionally allocates the two new data buffers in which to enqueue the produced data. In the second operation 694, the producer 610 updates the elements of the available ring 606 to reflect the data in the data buffers 602 available for consumption. Accordingly, it should be appreciated that by using the with the non-blocking zero-copy scheme as described herein, the slower consumer (1) 616a will not block the faster consumer (2) 616b.

EXAMPLES

Illustrative examples of the technologies disclosed herein are provided below. An embodiment of the technologies may include any one or more, and any combination of, the examples described below.

Example 1 includes a compute node for managing a single-producer and single-consumer ring, the compute node comprising a producer to (i) allocate a plurality of data buffers of the compute node; (ii) produce work; and (iii) transmit an indication of the produced work to the non-blocking zero copy scheme management circuitry; non-blocking zero copy scheme management circuitry to (i) insert reference information for each of the allocated plurality of data buffers into a respective one a plurality of elements of a ring and (ii) store the produced work into at least a portion of the plurality of data buffers based on the indication of the produced work; and a consumer to request the produced work from the ring, wherein the non-blocking zero copy scheme management circuitry is further to (i) dequeue, in response to having received a request for the produced work, the reference information from each of the plurality of elements of the ring that correspond to the portion of data buffers in which the produced work has been stored and (ii) set each of the plurality of elements of the ring for which the reference information has been dequeued to an empty value.

Example 2 includes the subject matter of Example 1, and wherein the producer is further to produce additional work; transmit an indication of the produced work; and transmit an indication of the produced additional work to the non-blocking zero copy scheme management circuitry, and wherein the non-blocking zero copy scheme management circuitry is further to determine an amount of data buffers required to store the produced additional work based on the indication of the produced additional work; identify a number of available data buffers of the ring; and store at least a portion of the produced additional work into each of the identified number of available data buffers of the ring.

Example 3 includes the subject matter of any of Examples 1 and 2, and wherein the non-blocking zero copy scheme management circuitry is further to determine whether additional data buffers need to be allocated based on the identified number of available data buffers of the ring and an amount of the produced additional work.

Example 4 includes the subject matter of any of Examples 1-3, and wherein the non-blocking zero copy scheme management circuitry is further to identify, in response to a determination that the identified number of available data buffers of the ring is less than the determined amount of data buffers required to store the produced additional work, a number of available data buffers of the ring that include the empty value, and wherein the producer is further to allocate, in response to the non-blocking zero copy scheme management circuitry having identified the number of available data buffers of the ring that include the empty value an amount of data buffers, one or more additional data buffers based on a difference between the identified number of available data buffers of the ring and the determined amount of data buffers required to store the produced additional work.

Example 5 includes the subject matter of any of Examples 1-4, and wherein the non-blocking zero copy scheme management circuitry is further to (i) store a portion of the produced additional work into each of the identified number of available data buffers of the ring and (ii) store a remaining portion of the portion of the produced additional work into each of the one or more additional data buffers allocated by the producer.

Example 6 includes the subject matter of any of Examples 1-5, and wherein to identify the number of available data buffers of the ring comprises to identify the number of available data buffers of the ring based on which of the plurality of element of the ring include the reference information to each of a plurality of previously allocated data buffers.

Example 7 includes the subject matter of any of Examples 1-6, and wherein to identify the number of available data buffers of the ring comprises to identify the number of available data buffers of the ring based on which of the plurality of element of the ring include the empty value.

Example 8 includes the subject matter of any of Examples 1-7, and wherein the consumer is further to (i) perform one or more processing operations on the produced work and (ii) return, subsequent to having performed the one or more processing operations, the reference information corresponding to the data buffers in which the produced work has been stored to the non-blocking zero copy scheme management circuitry.

Example 9 includes the subject matter of any of Examples 1-8, and wherein the non-blocking zero copy scheme management circuitry is further to enqueue the returned reference information into each of a corresponding number of the plurality of elements of the ring which contain the empty value.

Example 10 includes one or more machine-readable storage media comprising a plurality of instructions stored thereon that, in response to being executed, cause a compute node to allocate, by a producer of the compute node, a plurality of data buffers of the compute node; produce, by the producer, work; transmit, by the producer, an indication of the produced work to the non-blocking zero copy scheme management circuitry; insert, by the compute node, reference information for each of the allocated plurality of data buffers into a respective one a plurality of elements of a ring; store, by the compute node, the produced work into at least a portion of the plurality of data buffers based on the indication of the produced work; request, by a consumer of the compute node, the produced work from the ring; dequeue, by the compute node and in response to having received a request for the produced work, the reference information from each of the plurality of elements of the ring that correspond to the portion of data buffers in which the produced work has been stored; and set, by the compute node, each of the plurality of elements of the ring for which the reference information has been dequeued to an empty value.

Example 11 includes the subject matter of Example 10, and wherein the plurality of instructions further cause the producer to produce additional work; transmit an indication of the produced work; and transmit an indication of the produced additional work to the compute node, and wherein the plurality of instructions further cause the compute node to determine an amount of data buffers required to store the produced additional work based on the indication of the produced additional work; identify a number of available data buffers of the ring; and store at least a portion of the produced additional work into each of the identified number of available data buffers of the ring.

Example 12 includes the subject matter of any of Examples 10 and 11, and wherein the plurality of instructions further cause the compute node to determine whether additional data buffers need to be allocated based on the identified number of available data buffers of the ring and an amount of the produced additional work.

Example 13 includes the subject matter of any of Examples 10-12, and wherein the plurality of instructions further cause the compute node to identify, in response to a determination that the identified number of available data buffers of the ring is less than the determined amount of data buffers required to store the produced additional work, a number of available data buffers of the ring that include the empty value, and wherein the plurality of instructions further cause the producer to allocate, in response to the non-blocking zero copy scheme management circuitry having identified the number of available data buffers of the ring that include the empty value an amount of data buffers, one or more additional data buffers based on a difference between the identified number of available data buffers of the ring and the determined amount of data buffers required to store the produced additional work.

Example 14 includes the subject matter of any of Examples 10-13, and wherein the plurality of instructions further cause the compute node to (i) store a portion of the produced additional work into each of the identified number of available data buffers of the ring and (ii) store a remaining portion of the portion of the produced additional work into each of the one or more additional data buffers allocated by the producer.

Example 15 includes the subject matter of any of Examples 10-14, and wherein to identify the number of available data buffers of the ring comprises to identify the number of available data buffers of the ring based on which of the plurality of element of the ring include the reference information to each of a plurality of previously allocated data buffers.

Example 16 includes the subject matter of any of Examples 10-15, and wherein to identify the number of available data buffers of the ring comprises to identify the number of available data buffers of the ring based on which of the plurality of element of the ring include the empty value.

Example 17 includes the subject matter of any of Examples 10-16, and wherein the plurality of instructions further cause the consumer to (i) perform one or more processing operations on the produced work and (ii) return, subsequent to having performed the one or more processing operations, the reference information corresponding to the data buffers in which the produced work has been stored to the non-blocking zero copy scheme management circuitry.

Example 18 includes the subject matter of any of Examples 10-17, and wherein the plurality of instructions further cause the compute node to enqueue the returned reference information into each of a corresponding number of the plurality of elements of the ring which contain the empty value.

Example 19 includes a method for managing a single-producer and single-consumer ring, the method comprising allocating, by a producer of a compute node, a plurality of data buffers of the compute node; producing, by the producer, work; transmitting, by the producer, an indication of the produced work to the non-blocking zero copy scheme management circuitry; inserting, by the compute node, reference information for each of the allocated plurality of data buffers into a respective one a plurality of elements of a ring; storing, by the compute node, the produced work into at least a portion of the plurality of data buffers based on the indication of the produced work; requesting, by a consumer of the compute node, the produced work from the ring; dequeuing, by the compute node and in response to having received a request for the produced work, the reference information from each of the plurality of elements of the ring that correspond to the portion of data buffers in which the produced work has been stored; and setting, by the compute node, each of the plurality of elements of the ring for which the reference information has been dequeued to an empty value.

Example 20 includes the subject matter of Example 19, and further comprising producing, by the producer, additional work; transmitting, by the producer, an indication of the produced work; transmitting, by the producer, an indication of the produced additional work to the compute node; determining, by the compute node, an amount of data buffers required to store the produced additional work based on the indication of the produced additional work; identifying, by the compute node, a number of available data buffers of the ring; and storing, by the compute node, at least a portion of the produced additional work into each of the identified number of available data buffers of the ring.

Example 21 includes the subject matter of any of Examples 19 and 20, and further comprising determining, by the compute node, whether additional data buffers need to be allocated based on the identified number of available data buffers of the ring and an amount of the produced additional work.

Example 22 includes the subject matter of any of Examples 19-21, and further comprising identifying, by the compute node and in response to a determination that the identified number of available data buffers of the ring is less than the determined amount of data buffers required to store the produced additional work, a number of available data buffers of the ring that include the empty value; and allocating, by the producer and in response to the non-blocking zero copy scheme management circuitry having identified the number of available data buffers of the ring that include the empty value an amount of data buffers, one or more additional data buffers based on a difference between the identified number of available data buffers of the ring and the determined amount of data buffers required to store the produced additional work.

Example 23 includes the subject matter of any of Examples 19-22, and further comprising storing, by the compute node, a portion of the produced additional work into each of the identified number of available data buffers of the ring; and storing, by the compute node, a remaining portion of the portion of the produced additional work into each of the one or more additional data buffers allocated by the producer.

Example 24 includes the subject matter of any of Examples 19-23, and further comprising performing, by the consumer, one or more processing operations on the produced work; and returning, by the consumer and subsequent to having performed the one or more processing operations, the reference information corresponding to the data buffers in which the produced work has been stored to the non-blocking zero copy scheme management circuitry.

Example 25 includes the subject matter of any of Examples 19-24, and further comprising enqueuing, by the compute node, the returned reference information into each of a corresponding number of the plurality of elements of the ring which contain the empty value.

The invention claimed is:

1. A compute node for managing a single-producer and single-consumer ring, the compute node comprising:
a producer to (i) allocate a plurality of data buffers of the compute node; (ii) produce work; and (iii) transmit an indication of the produced work to non-blocking zero copy scheme management circuitry;
non-blocking zero copy scheme management circuitry to (i) insert reference information for each of the allocated plurality of data buffers into a respective one a plurality of elements of a ring and (ii) store the produced work into at least a portion of the plurality of data buffers based on the indication of the produced work; and
a consumer to request the produced work from the ring, wherein the non-blocking zero copy scheme management circuitry is further to (i) dequeue, in response to having received a request for the produced work, the reference information from each of the plurality of elements of the ring that correspond to the portion of data buffers in which the produced work has been stored and (ii) set each of the plurality of elements of the ring for which the reference information has been dequeued to an empty value.

2. The compute node of claim 1,
wherein the producer is further to:
produce additional work;
transmit an indication of the produced work; and
transmit an indication of the produced additional work to the non-blocking zero copy scheme management circuitry, and
wherein the non-blocking zero copy scheme management circuitry is further to:
determine an amount of data buffers required to store the produced additional work based on the indication of the produced additional work;
identify a number of available data buffers of the ring; and
store at least a portion of the produced additional work into each of the identified number of available data buffers of the ring.

3. The compute node of claim 2, wherein the non-blocking zero copy scheme management circuitry is further to determine whether additional data buffers need to be allocated based on the identified number of available data buffers of the ring and an amount of the produced additional work.

4. The compute node of claim 3, wherein the non-blocking zero copy scheme management circuitry is further to identify, in response to a determination that the identified number of available data buffers of the ring is less than the determined amount of data buffers required to store the produced additional work, a number of available data buffers of the ring that include the empty value, and
wherein the producer is further to allocate, in response to the non-blocking zero copy scheme management circuitry having identified the number of available data buffers of the ring that include the empty value an amount of data buffers, one or more additional data buffers based on a difference between the identified number of available data buffers of the ring and the determined amount of data buffers required to store the produced additional work.

5. The compute node of claim 4, wherein the non-blocking zero copy scheme management circuitry is further to (i) store a portion of the produced additional work into each of the identified number of available data buffers of the ring and (ii) store a remaining portion of the portion of the produced additional work into each of the one or more additional data buffers allocated by the producer.

6. The compute node of claim 2, wherein to identify the number of available data buffers of the ring comprises to identify the number of available data buffers of the ring based on which of the plurality of element of the ring include the reference information to each of a plurality of previously allocated data buffers.

7. The compute node of claim 2, wherein to identify the number of available data buffers of the ring comprises to identify the number of available data buffers of the ring based on which of the plurality of element of the ring include the empty value.

8. The compute node of claim 1, wherein the consumer is further to (i) perform one or more processing operations on the produced work and (ii) return, subsequent to having performed the one or more processing operations, the reference information corresponding to the data buffers in which the produced work has been stored to the non-blocking zero copy scheme management circuitry.

9. The compute node of claim 8, wherein the non-blocking zero copy scheme management circuitry is further to enqueue the returned reference information into each of a corresponding number of the plurality of elements of the ring which contain the empty value.

10. One or more machine-readable storage media comprising a plurality of instructions stored thereon that, in response to being executed, cause a compute node to:
   allocate, by a producer of the compute node, a plurality of data buffers of the compute node;
   produce, by the producer, work;
   transmit, by the producer, an indication of the produced work to non-blocking zero copy scheme management circuitry;
   insert, by the compute node, reference information for each of the allocated plurality of data buffers into a respective one a plurality of elements of a ring;
   store, by the compute node, the produced work into at least a portion of the plurality of data buffers based on the indication of the produced work;
   request, by a consumer of the compute node, the produced work from the ring;
   dequeue, by the compute node and in response to having received a request for the produced work, the reference information from each of the plurality of elements of the ring that correspond to the portion of data buffers in which the produced work has been stored; and
   set, by the compute node, each of the plurality of elements of the ring for which the reference information has been dequeued to an empty value.

11. The one or more machine-readable storage media of claim 10,
   wherein the plurality of instructions further cause the producer to:
      produce additional work;
      transmit an indication of the produced work; and
      transmit an indication of the produced additional work to the compute node, and
   wherein the plurality of instructions further cause the compute node to:
      determine an amount of data buffers required to store the produced additional work based on the indication of the produced additional work;
      identify a number of available data buffers of the ring; and
      store at least a portion of the produced additional work into each of the identified number of available data buffers of the ring.

12. The one or more machine-readable storage media of claim 11, wherein the plurality of instructions further cause the compute node to determine whether additional data buffers need to be allocated based on the identified number of available data buffers of the ring and an amount of the produced additional work.

13. The one or more machine-readable storage media of claim 12, wherein the plurality of instructions further cause the compute node to identify, in response to a determination that the identified number of available data buffers of the ring is less than the determined amount of data buffers required to store the produced additional work, a number of available data buffers of the ring that include the empty value, and
   wherein the plurality of instructions further cause the producer to allocate, in response to the non-blocking zero copy scheme management circuitry having identified the number of available data buffers of the ring that include the empty value an amount of data buffers, one or more additional data buffers based on a difference between the identified number of available data buffers of the ring and the determined amount of data buffers required to store the produced additional work.

14. The one or more machine-readable storage media of claim 13, wherein the plurality of instructions further cause the compute node to (i) store a portion of the produced additional work into each of the identified number of available data buffers of the ring and (ii) store a remaining portion of the portion of the produced additional work into each of the one or more additional data buffers allocated by the producer.

15. The one or more machine-readable storage media of claim 11, wherein to identify the number of available data buffers of the ring comprises to identify the number of available data buffers of the ring based on which of the plurality of element of the ring include the reference information to each of a plurality of previously allocated data buffers.

16. The one or more machine-readable storage media of claim 11, wherein to identify the number of available data buffers of the ring comprises to identify the number of available data buffers of the ring based on which of the plurality of element of the ring include the empty value.

17. The one or more machine-readable storage media of claim 10, wherein the plurality of instructions further cause the consumer to (i) perform one or more processing operations on the produced work and (ii) return, subsequent to having performed the one or more processing operations, the reference information corresponding to the data buffers in which the produced work has been stored to the non-blocking zero copy scheme management circuitry.

18. The one or more machine-readable storage media of claim 17, wherein the plurality of instructions further cause the compute node to enqueue the returned reference information into each of a corresponding number of the plurality of elements of the ring which contain the empty value.

19. A method for managing a single-producer and single-consumer ring, the method comprising:
   allocating, by a producer of a compute node, a plurality of data buffers of the compute node;
   producing, by the producer, work;
   transmitting, by the producer, an indication of the produced work to non-blocking zero copy scheme management circuitry;
   inserting, by the compute node, reference information for each of the allocated plurality of data buffers into a respective one a plurality of elements of a ring;
   storing, by the compute node, the produced work into at least a portion of the plurality of data buffers based on the indication of the produced work;

requesting, by a consumer of the compute node, the produced work from the ring;

dequeuing, by the compute node and in response to having received a request for the produced work, the reference information from each of the plurality of elements of the ring that correspond to the portion of data buffers in which the produced work has been stored; and setting, by the compute node, each of the plurality of elements of the ring for which the reference information has been dequeued to an empty value.

20. The method of claim 19, further comprising:

producing, by the producer, additional work;

transmitting, by the producer, an indication of the produced work;

transmitting, by the producer, an indication of the produced additional work to the compute node;

determining, by the compute node, an amount of data buffers required to store the produced additional work based on the indication of the produced additional work;

identifying, by the compute node, a number of available data buffers of the ring; and storing, by the compute node, at least a portion of the produced additional work into each of the identified number of available data buffers of the ring.

21. The method of claim 20, further comprising determining, by the compute node, whether additional data buffers need to be allocated based on the identified number of available data buffers of the ring and an amount of the produced additional work.

22. The method of claim 21, further comprising:

identifying, by the compute node and in response to a determination that the identified number of available data buffers of the ring is less than the determined amount of data buffers required to store the produced additional work, a number of available data buffers of the ring that include the empty value; and allocating, by the producer and in response to the non-blocking zero copy scheme management circuitry having identified the number of available data buffers of the ring that include the empty value an amount of data buffers, one or more additional data buffers based on a difference between the identified number of available data buffers of the ring and the determined amount of data buffers required to store the produced additional work.

23. The method of claim 22, further comprising:

storing, by the compute node, a portion of the produced additional work into each of the identified number of available data buffers of the ring; and storing, by the compute node, a remaining portion of the portion of the produced additional work into each of the one or more additional data buffers allocated by the producer.

24. The method of claim 19, further comprising:

performing, by the consumer, one or more processing operations on the produced work; and returning, by the consumer and subsequent to having performed the one or more processing operations, the reference information corresponding to the data buffers in which the produced work has been stored to the non-blocking zero copy scheme management circuitry.

25. The method of claim 24, further comprising enqueuing, by the compute node, the returned reference information into each of a corresponding number of the plurality of elements of the ring which contain the empty value.

* * * * *